(12) United States Patent
Yin et al.

US012633648B2

(10) Patent No.: US 12,633,648 B2
(45) Date of Patent: May 19, 2026

(54) PASSIVE/ACTIVE BASE STATION ANTENNA SYSTEMS HAVING PASSIVE REFLECTOR ASSEMBLIES WITH AN OPENING FOR AN ACTIVE ANTENNA ARRAY

(71) Applicant: Outdoor Wireless Networks LLC, Claremont, NC (US)

(72) Inventors: MeiHua Yin, Suzhou (CN); PuLiang Tang, Suzhou (CN); Nengbin Liu, Suzhou (CN); Xun Zhang, Suzhou (CN); Qiang Liu, Suzhou (CN); YueMin Li, Suzhou (CN); Xiaohua Tian, Suzhou (CN); Jiajia Ni, Suzhou (CN); Xiaoan Fu, Suzhou (CN); Haifei Qin, Suzhou (CN); Jiaping Xu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 302 days.

(21) Appl. No.: 18/203,681

(22) Filed: May 31, 2023

(65) Prior Publication Data

US 2023/0395971 A1 Dec. 7, 2023

(30) Foreign Application Priority Data

Jun. 1, 2022 (CN) ......................... 202210616612.8
Aug. 11, 2022 (CN) ......................... 202210960474.5

(51) Int. Cl.

| | |
|---|---|
| ***H01Q 1/24*** | (2006.01) |
| ***H01Q 15/14*** | (2006.01) |
| ***H01Q 21/29*** | (2006.01) |

(52) U.S. Cl.

CPC ............ *H01Q 1/246* (2013.01); *H01Q 15/14* (2013.01); *H01Q 21/29* (2013.01)

(58) Field of Classification Search

CPC ........ H01Q 1/246; H01Q 15/14; H01Q 21/29; H01Q 5/48; H01Q 21/062; H01Q 21/24; H01Q 21/26

See application file for complete search history.

(56) References Cited

U.S. PATENT DOCUMENTS

| | | | | |
|---|---|---|---|---|
| 6,285,336 | B1 * | 9/2001 | Zimmerman .......... | H01Q 1/246 343/803 |
| 6,317,099 | B1 * | 11/2001 | Zimmerman ............ | H01Q 9/26 343/803 |
| 6,650,301 | B1 * | 11/2003 | Zimmerman ............ | H01Q 9/26 343/803 |
| 2006/0273865 | A1 | 12/2006 | Timofeev et al. | |

(Continued)

OTHER PUBLICATIONS

"Extended European Search Report dated Oct. 10, 2023, issued in corresponding European Application No. 23176433.3".

*Primary Examiner* — Hai V Tran
(74) *Attorney, Agent, or Firm* — Myers Bigel, P.A.

(57) ABSTRACT

A base station antenna comprises a reflector assembly and a first radiating element having a first feed stalk and a first radiator. A base of the first feed stalk is adjacent the reflector assembly and the first radiator is adjacent a distal end of the first feed stalk. A center of the first radiator is offset from the base of the first feed stalk in a longitudinal direction that is parallel to a longitudinal axis of the base station antenna.

19 Claims, 14 Drawing Sheets

(56) References Cited

U.S. PATENT DOCUMENTS

| | | | | |
|---|---|---|---|---|
| 2015/0295313 | A1* | 10/2015 | Zimmerman | H01Q 5/42 343/810 |
| 2017/0040679 | A1* | 2/2017 | Fröhler | H01Q 1/246 |
| 2017/0222313 | A1* | 8/2017 | Markof | H01Q 21/26 |
| 2021/0305717 | A1 | 9/2021 | Hou et al. | |
| 2022/0285857 | A1* | 9/2022 | Pollayi | H01Q 21/24 |

* cited by examiner

PASSIVE/ACTIVE BASE STATION ANTENNA SYSTEMS HAVING PASSIVE REFLECTOR ASSEMBLIES WITH AN OPENING FOR AN ACTIVE ANTENNA ARRAY

CROSS-REFERENCE TO RELATED APPLICATIONS

The present application claims priority under 35 U.S.C. § 119 to Chinese Patent Application Serial No. 202210960474.5, filed Aug. 11, 2022, and to Chinese Patent Application Serial No. 202210616612.8, filed Jun. 1, 2022, the entire content of each of which are incorporated herein by reference.

FIELD OF THE INVENTION

The present invention generally relates to radio communications and, more particularly, to base station antenna systems that include both passive and active antenna arrays.

BACKGROUND

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. Typically, the base station antennas are mounted on a tower or other raised structure, with the radiation patterns (also referred to herein as "antenna beams") that are generated by the base station antennas directed outwardly.

A common base station configuration is the three sector configuration in which a cell is divided into three 120° "sectors" in the azimuth (horizontal) plane. A separate base station antenna provides coverage (service) to each sector. Typically, each base station antenna will include multiple vertically-extending columns of radiating elements that operate, for example, using second generation ("2G"), third generation ("3G") or fourth generation ("4G") cellular network protocols. These vertically-extending columns of radiating elements are typically referred to as "linear arrays," and may be straight columns or columns in which some of the radiating elements are staggered horizontally. Most modern base station antennas include both "low-band" linear arrays of radiating elements that support service in some or all of the 617-960 MHz frequency band and "mid-band" linear arrays of radiating elements that support service in some or all of the 1427-2690 MHz frequency band. These linear arrays are typically formed using dual-polarized radiating elements, which allows each array to transmit and receive RE signals at two orthogonal polarizations.

Each of the above-described linear arrays is coupled to two ports of a radio (one port for each polarization). An RF signal that is to be transmitted by a linear array is passed from the radio to the antenna where it is divided into a plurality of sub-components, with each sub-component fed to a respective subset of the radiating elements in the linear array (typically each sub-component is fed to between one and three radiating elements). The sub-components of the RF signal are transmitted through the radiating elements to generate an antenna beam that covers a generally fixed coverage area, such as a sector of a cell. Typically these linear arrays will have remote electronic tilt ("RET") capabilities which allow a cellular operator to change the pointing angle of the generated antenna beams in the elevation (vertical) plane in order to change the size of the sector served by the linear array. Since the antenna beams generated by the above-described 2G/3G/4G linear arrays generate static antenna beams, they are often referred to as "passive" linear arrays.

Most cellular operators are currently upgrading their networks to support fifth generation ("5G") cellular service. One important component of 5G cellular service is the use of so-called multi-column "active" beamforming arrays that operate in conjunction with active beamforming radios to dynamically adjust the size, shape and pointing direction of the antenna beams that are generated by the active beamforming array. These active beamforming arrays are typically formed using "high-band" radiating elements that operate in higher frequency bands, such as some or all of the 3.3-4.2 GHz and/or the 5.1-5.8 GHz frequency bands. Each column of such an active beamforming array is typically coupled to a respective port of a beamforming radio. The beamforming radio may be a separate device, or may be integrated with the active antenna array. The beamforming radio may adjust the amplitudes and phases of the sub-components of an RF signal that are fed to each port of the radio in order to generate antenna beams that have narrowed beamwidths in the azimuth plane (and hence higher antenna gain). These narrowed antenna beams can be electronically steered in the azimuth plane by proper selection of the amplitudes and phases of the sub-components of an RF signal.

In order to avoid having to increase the number of antennas at cell sites, the above-described 5G antennas also often include passive linear arrays that support legacy 2G, 3G and/or 4G cellular services. In some cases, both the active beamforming arrays and the passive linear arrays may be included in a single base station antenna. Another solution for providing an antenna that supports both 2G/3G/4G and 5G cellular service is to mount a 5G active antenna module (i.e., a module that includes an active beamforming array and associated beamforming radio) on the rear surface of a passive base station antenna that includes a plurality of 2G, 3G, and/or 4G passive linear arrays. An opening is provided in the reflector of the passive base station antenna so that the antenna beams generated by the active beamforming array can be transmitted through the passive base station antenna. This design is advantageous as the active antenna module may be removable, and hence as enhanced 5G capabilities are developed, a cellular operator may replace the original active antenna module with an upgraded active antenna module without having to replace the passive base station antenna. Herein, the combination of a passive base station antenna that has an active antenna module mounted thereon is referred to as a "passive/active antenna system."

SUMMARY

Pursuant to embodiments of the present invention, base station antennas are provided that comprise a reflector assembly and a first radiating element having a first feed stalk and a first radiator. A base of the first feed stalk is adjacent the reflector assembly and the first radiator is adjacent a distal end of the first feed stalk. A center of the first radiator is offset from the base of the first feed stalk in a longitudinal direction that is parallel to a longitudinal axis of the base station antenna.

In some embodiments, the reflector assembly includes a main reflector, longitudinally-extending first and second reflector strips that extend from the main reflector and are spaced apart from each other in a transverse direction that is perpendicular to the longitudinal direction, and a transversely-extending third reflector strip that extends between the first and second reflector strips.

In some embodiments, the first radiating element may be mounted to extend forwardly from the third reflector strip. In such embodiments, the reflector assembly may include an opening that is bounded by an upper edge of the main reflector and the first through third reflector strips. In some embodiments, at least half of the first radiator may overlap this opening in a direction perpendicular to the main reflector.

In some embodiments, the base station antenna may further comprise a first RF port, the first radiating element is part of a first array of radiating elements that are all coupled to the first RF port, and a second radiating element that is part of the first array of radiating elements is mounted to extend forwardly from the first reflector strip.

In some embodiments, a third radiating element that is part of the first array of radiating elements is mounted to extend forwardly from the main reflector.

In some embodiments, the second radiating element has a second feed stalk and a second radiator, where a base of the second feed stalk is adjacent the reflector assembly and the second radiator is adjacent a distal end of the second feed stalk, and wherein a center of the second radiator is offset from the base of the second feed stalk in the transverse direction.

In some embodiments, the first feed stalk is a tilted feed stalk that extends forwardly from the third reflector strip in a first plane and the second feed stalk is a tilted feed stalk that extends forwardly from the first reflector strip in a second plane, where the first plane is substantially perpendicular to the second plane.

In some embodiments, the second radiating element extends forwardly from a portion of the first reflector strip that is widened in the transverse direction.

In some embodiments, front surfaces of the respective first and second reflector strips extend in a first plane that is positioned rearwardly of a plane defined by a front surface of the main reflector.

In some embodiments, the first reflector strip comprises a first integrated strip that is monolithic with the main reflector and a first auxiliary strip that is mounted on the first integrated strip, and the second reflector strip comprises a second integrated strip that is monolithic with the main reflector and a second auxiliary strip that is mounted on the second integrated strip.

In some embodiments, the first integrated strip and the first auxiliary strip together form a first tubular structure, and the second radiating element extends forwardly from a feedboard printed circuit board that is mounted on a forward surface of the first tubular structure.

In some embodiments, the first auxiliary strip includes a front wall that is parallel to a front surface of the main reflector and a sidewall that extends rearwardly from the front wall, and the first integrated strip includes a rear wall that is parallel to the front surface of the main reflector and a sidewall that extends forwardly from the rear wall.

In some embodiments, the second radiating element is mounted to extend forwardly from a feed board, and the feed board is mounted on the first auxiliary strip.

In some embodiments, the third reflector strip comprises a first transverse strip that extends in the transverse direction from the first auxiliary strip, a second transverse strip that extends in the transverse direction from the second auxiliary strip, and a transversely-extending crossbar that is connected to the first and second transverse strips.

Pursuant to additional embodiments of the present invention, base station antennas are provided that comprise a reflector assembly that extends in a longitudinal direction. The reflector assembly includes a main reflector that has a main reflecting surface and spaced-apart first and second integrated strips that are integral with and extend longitudinally from respective first and second opposed sides of the main reflector, a first auxiliary strip mounted on the first integrated strip, and a second auxiliary strip mounted on the second integrated strip. The first and second auxiliary strips are non-planar metal strips.

In some embodiments, the first and second auxiliary strips are bent sheet metal strips.

In some embodiments, the first auxiliary strip is mounted forwardly of the first integrated strip, and the second auxiliary strip is mounted forwardly of the second integrated strip.

In some embodiments, the first auxiliary strip has a front wall that is parallel to the main reflecting surface and a sidewall that extends rearwardly from the front wall.

In some embodiments, the first integrated strip has a rear wall that is parallel to the main reflecting surface and a sidewall that extends forwardly from the rear wall.

In some embodiments, the base station antenna further comprises at least one first insulating gasket interposed between the first integrated strip and the first auxiliary strip, and at least one second insulating gasket interposed between the second integrated strip and the second auxiliary strip.

In some embodiments, the first integrated strip and the first auxiliary strip together form a first reflector strip that has a tubular structure, the base station antenna further comprising a radiating element that extends forwardly from a first feedboard printed circuit board that is mounted on a front surface of the first reflector strip, and wherein the second integrated strip and the second auxiliary strip together form a second reflector strip that has a tubular structure.

In some embodiments, the base station antenna further comprises a third reflector strip that extends in a transverse direction between the first and second reflector strips.

In some embodiments, the radiating element is a first radiating element, the base station antenna further comprising a second radiating element that extends forwardly from a second feedboard printed circuit board that is mounted on a front surface of the third reflector strip, wherein the first and second radiating elements are both part of a first array of radiating elements and both the first and second radiating elements are coupled to a first radio frequency ("RF") port of the base station antenna.

In some embodiments, a feed stalk of the first radiating element extends forwardly from the first reflector strip at an oblique angle and is tilted in a first direction and a feed stalk of the second radiating element extends forwardly from the third reflector strip at an oblique angle and is tilted in a second direction that is different from the first direction.

In some embodiments, the first array further comprises a third radiating element that extends forwardly from the main reflector, the third radiating element including a feed stalk that extends perpendicular to the main reflector.

In some embodiments, the first reflector strip includes a widened section that has an increased width in a transverse direction that is perpendicular to the longitudinal direction, and the first feedboard printed circuit board is mounted on the widened section.

In some embodiments, portions of the first reflector strip have a width in the transverse direction that is less than a width of the first feedboard printed circuit board.

Pursuant to further embodiments of the present invention, base station antennas are provided that comprise a reflector assembly having a main reflector that includes a forwardly-facing planar main reflecting surface and spaced-apart first and second tubular reflector strips that each have a front wall, a rear wall and first and second sidewalls, the first and second tubular reflector strips extending longitudinally from respective first and second opposed sides of the main reflector.

In some embodiments, the reflector assembly further includes first and second radio frequency choke sections that are positioned rearwardly of the main reflector.

In some embodiments, the first tubular reflector strip comprises a first integrated strip that is monolithic with the main reflector and a first auxiliary strip that is mounted on the first integrated strip, and wherein the second tubular reflector strip comprises a second integrated strip that is monolithic with the main reflector and a second auxiliary strip that is mounted on the second integrated strip.

In some embodiments, the first integrated strip forms the rear wall and at least one of the first and second sidewalls of the first tubular reflector strip, and the second integrated strip forms the front wall and at least one of the first and second sidewalls of the second tubular reflector strip.

In some embodiments, the base station antenna further comprises a first RF port and a first linear array of radiating elements that are all coupled to a first RF port, wherein a first of the radiating elements in the first linear array is mounted on the first tubular reflector strip.

In some embodiments, the reflector assembly further comprises a third reflector strip that extends transversely between distal end portions of the first and second tubular reflector strips.

In some embodiments, a second of the radiating elements in the first linear array is mounted on the third reflector strip.

In some embodiments, the first of the radiating elements in the first linear array includes a first tilted feed stalk that extends forwardly from the first tubular reflector strip at an oblique angle in a first plane, and the second of the radiating elements in the first linear array includes a second tilted feed stalk that extends forwardly from the third reflector strip at an oblique angle in a second plane.

In some embodiments, the first plane is substantially perpendicular to the second plane.

In some embodiments, a third of the radiating elements in the first linear array is mounted to extend forwardly from the main reflector, where the third of the radiating elements in the first linear array has a feed stalk that extends perpendicularly to the main reflector.

Pursuant to still further embodiments of the present invention, base station antennas are provided that comprise a reflector assembly having a main reflector that includes a forwardly-facing planar main reflector surface and spaced-apart first and second reflector strips that extend from respective first and second opposed sides of the main reflector. The first reflector strip includes a front wall that has a widened region that is wider in a transverse direction than are first and second narrowed regions of the front wall that are on either side of the widened section in a longitudinal direction of the first reflector strip, where the longitudinal direction is perpendicular to the transverse direction.

In some embodiments, the first reflector strip further includes an outer sidewall and an inner sidewall, wherein the inner sidewall comprises a plurality of discontinuous segments.

In some embodiments, the base station antenna further comprises a feedboard mounted on the widened region.

In some embodiments, the first reflector strip is a tubular reflector strip that has the front wall, a rear wall and first and second sidewalls.

In some embodiments, the reflector assembly further comprising a first RF choke that is positioned behind the main reflector, wherein a width of the first RF choke in the transverse direction is greater than widths of the first and second narrowed regions of the front wall.

In some embodiments, the first reflector strip comprises a first integrated strip that is monolithic with the main reflector and a first auxiliary strip that is mounted on the first integrated strip.

In some embodiments, the reflector assembly further comprising a third reflector strip that extends in the transverse direction from a distal end of the first reflector strip.

In some embodiments, a first portion of the third reflector strip is integral with the first auxiliary strip.

Pursuant to further embodiments of the present invention, base station antennas are provided that include a longitudinally-extending passive reflector assembly that includes a main reflector that has a main reflecting surface and spaced-apart first and second integrated strips that are integral with and extend longitudinally from respective first and second opposed sides of the main reflector. A first plurality of non-metal (dielectric) auxiliary strips are mounted on the first integrated strip, and a second plurality of auxiliary strips are mounted on the second integrated strip. Each dielectric auxiliary strip includes a respective forwardly-facing radiating element mounting surface.

In some embodiments, each of the dielectric auxiliary strips includes an outer wall that connects to a first side of the forwardly-facing radiating element mounting surface and an inner wall. One or more supports connect the inner wall to a second side of the forwardly-facing radiating element mounting surface. The outer wall and the inner wall may each be connected to the integrated strip by fasteners such as rivets (not shown). The forwardly-facing radiating element mounting surface may include a plurality of cable openings in some embodiments. In some embodiments, first through third feedboards are mounted on the auxiliary strip, and first through third radiating elements are mounted on the respective first through third feedboards. The first radiating element may be a low-band radiating element that is configured to operate in a first frequency band and the second and third radiating elements may be mid-band radiating elements that are configured to operate in a second frequency band that encompasses higher frequencies than the first frequency band. Metal ground planes of the second and third feedboards each have a smaller footprint than a dipole radiator printed circuit board of the respective second and third radiating elements.

DETAILED DESCRIPTION

Figure 1A:
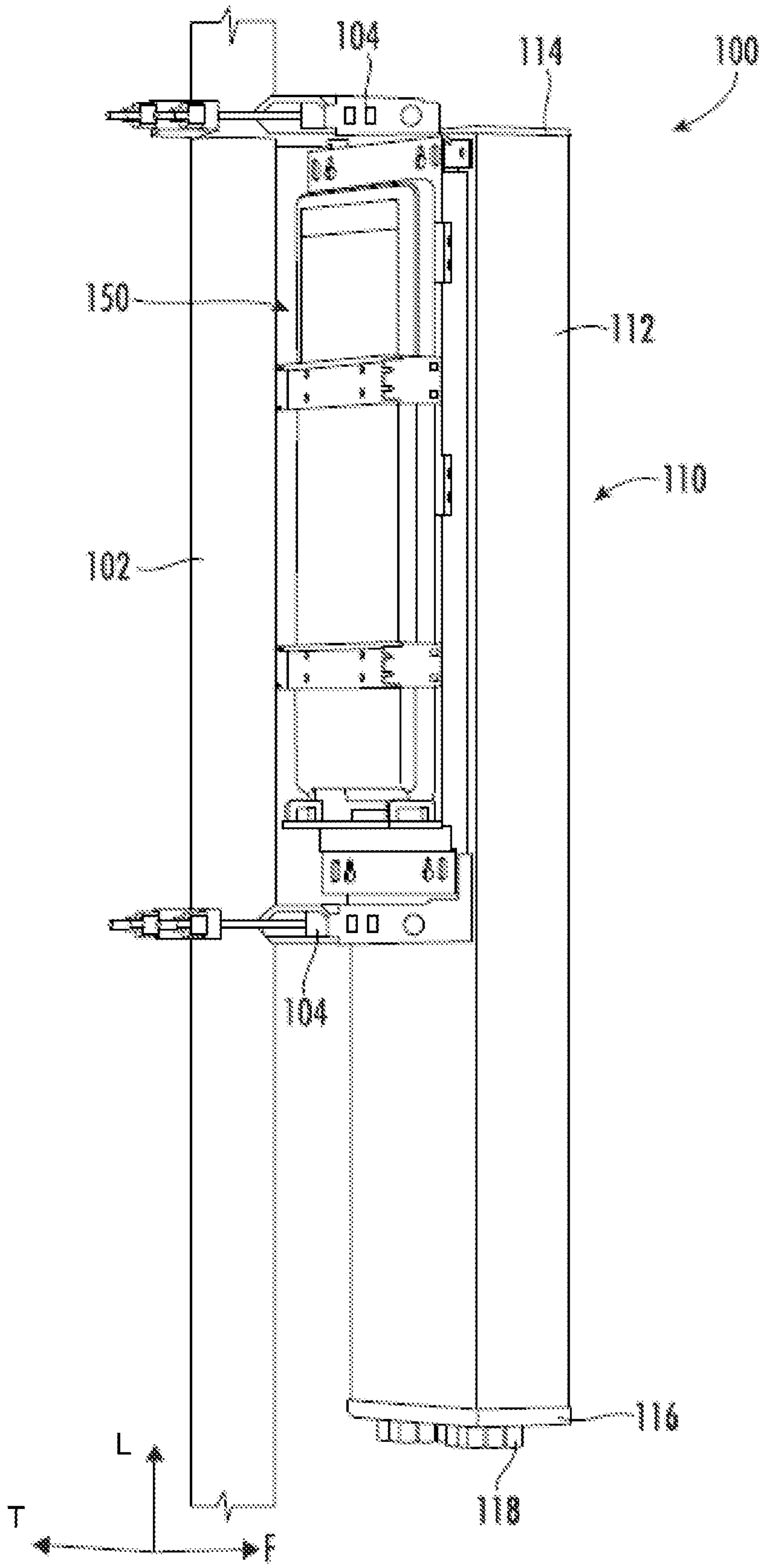
FIG. 1A is a schematic rear perspective view of a passive/active antenna system that comprises a passive base station antenna that has an active antenna module mounted thereon.

Pursuant to embodiments of the present invention, passive base station antennas are provided that are suitable for use in passive/active antenna systems. The passive base station antennas according to embodiments of the present invention may have an improved reflector assembly that provides increased mechanical support and include features that improve the electronic scanning performance of an active beamforming array included in an active antenna module that is mounted on the passive base station antenna.

As discussed above, the reflector assembly of a passive base station antenna of a passive/active antenna systems (herein also referred to as the "passive reflector assembly") may include a large opening that allows RF energy from the active beamforming array included in the active antenna module to transmit and receive RF signals through the passive base station antenna. Unfortunately, the large opening in the passive reflector assembly reduces the structural support provided by the passive reflector assembly. This can reduce the rigidity of the passive base station antenna, which may result in components of the passive base station antenna experiencing increased movement under high wind environments. Such increased movement can negatively impact the RF performance of the passive base station antenna, and may also increase the likelihood that components of the antenna are damaged. In order to provide increased structural support, the passive reflector assembly may include first and second longitudinally-extending "reflector strips" that extend on either side of the opening, and may also include a third transversely-extending reflector strip that connects upper edges of the first and second longitudinally-extending reflector strips. The first and second reflector strips may increase the rigidity of the passive reflector, and may also serve as mounting locations for radiating elements of selected linear arrays of the passive base station antenna. Unfortunately, however, the first and second reflector strips may also interfere with the RF performance of the beamforming array of the active antenna module. This is particularly true when the beamforming array is electronically scanned to large scanning angles in the azimuth plane, as at these scanning angles the first and second reflector strips may block the RF energy emitted by the radiating elements that are closest to the first and second reflector strips.

The passive base station antennas according to some embodiments of the present invention may include first and second longitudinally-extending tubular reflector strips that exhibit increased strength and rigidity. In some embodiments, each tubular reflector strip may be formed from multiple pieces of sheet metal. For example, each tubular reflector strip may comprise two pieces of sheet metal, where at least one of the pieces of sheet metal includes a generally U-shaped or L-shaped transverse cross-section. The two pieces may be attached together to form the tubular reflector strip. Insulating gaskets may be provided that space the two pieces of metal apart from each other to avoid inconsistent metal-to-metal contact between the two pieces that might give rise to passive intermodulation ("PIM") distortion.

The reflector strips included in the passive base station antennas according to embodiments of the present invention may also include widened (e.g., in the transverse direction) sections that serve as mounting locations for feedboard printed circuit boards. For example, a first linear array of the passive base station antenna may include one or more radiating elements that extend from one or more feedboard printed circuit boards that are mounted on the first longitudinally-extending reflector strip, and a second linear array of the passive base station antenna may include one or more radiating elements that extend from one or more feedboard printed circuit boards that are mounted on the second longitudinally-extending reflector strip. The widened sections on the first and second reflector strips provide support for the feedboard printed circuit boards and ensure that the feedboard printed circuit boards do not bend. Regions of the first and second reflector strips that do not have feedboard printed circuit boards mounted thereon may be narrowed (e.g., in the transverse direction) as compared to the widened sections. The provision of these narrowed sections increases the size of the opening in the passive reflector (i.e., the width of the opening is increased everywhere except the locations where feedboard printed circuit boards are mounted on the first and second reflector strips). This increased width may improve the electronic scanning performance of the beamforming array of the active antenna module that is mounted behind the opening in the passive reflector assembly. The increased rigidity of the tubular reflector strips allows for the reduction in the width of much of each reflector strip without compromising the structural integrity of the passive base station antenna.

The radiating elements that extend from the feedboard printed circuit boards that are mounted on the reflector strips may, in some embodiment, have tilted feed stalks, so that the radiators of these radiating elements are positioned forwardly of the opening in the passive reflector assembly as explained, for example, in U.S. Patent Publication No. 2021/0305718, published Sep. 30, 2021 (herein "the '718 publication"), the entire content of which is incorporated herein by reference. In particular, the one or more radiating elements that extend from the one or more feedboard printed circuit boards that are mounted on the reflector strip that extends along the right side of the passive base station antenna (when the passive base station antenna is viewed from the front) may have feed stalks that extend forwardly and to the left, and the radiating elements that extend from the feedboard printed circuit boards that are mounted on the reflector strip that extends along the left side of the passive base station antenna may have feed stalks that extend forwardly and to the right. In some embodiments, a transversely-extending third reflector strip may be provided that connects the upper ends of the longitudinally-extending first and second reflector strips. One or more feedboard printed circuit boards may be mounted on the transversely-extending third reflector strip. The radiating elements that are mounted on the third reflector strip may also have tilted feed stalks that extend forwardly and downwardly so that radiators of these radiating elements are also positioned forwardly of the opening in the passive reflector assembly. The radiators of all of the radiating elements in the first linear array may be aligned along a first longitudinal axis in some embodiments, and the radiators of all of the radiating elements in the second linear array may be aligned along a second longitudinal axis in such embodiments.

In some embodiments, base station antennas are provided that include a reflector assembly and a first radiating element having a first feed stalk and a first radiator. A base of the first feed stalk is adjacent the reflector assembly and the first radiator is adjacent a distal end of the first feed stalk. A center of the first radiator is offset from the base of the first feed stalk in a longitudinal direction that is parallel to a longitudinal axis of the base station antenna.

In other embodiments, base station antennas are provided that include a reflector assembly that extends in a longitudinal direction. The reflector assembly includes a main reflector that has a main reflecting surface and spaced-apart first and second integrated strips that are integral with and extend longitudinally from respective first and second opposed sides of the main reflector. The reflector assembly further includes a first auxiliary strip that is mounted on the first integrated strip and a second auxiliary strip that is mounted on the second integrated strip, where the first and second auxiliary strips are non-planar metal strips.

In further embodiments, base station antennas are provided that include a reflector assembly having a main reflector that includes a forwardly-facing planar main reflecting surface and spaced-apart first and second tubular reflector strips that each have a front wall, a rear wall and first and second sidewalls, the first and second tubular reflector strips extending longitudinally from respective first and second opposed sides of the main reflector.

Finally, in other embodiments, base station antennas are provided that include a reflector assembly having a main reflector that includes a forwardly-facing planar main reflector surface and spaced-apart first and second reflector strips that extend from respective first and second opposed sides of the main reflector. The first reflector strip includes a front wall that has a widened region that is wider in a transverse direction than are first and second narrowed regions of the front wall that are on either side of the widened section in a longitudinal direction of the first reflector strip, where the longitudinal direction is perpendicular to the transverse direction.

Example embodiments of the present invention will now be discussed in further detail with reference to the drawings.

Figure 1B:
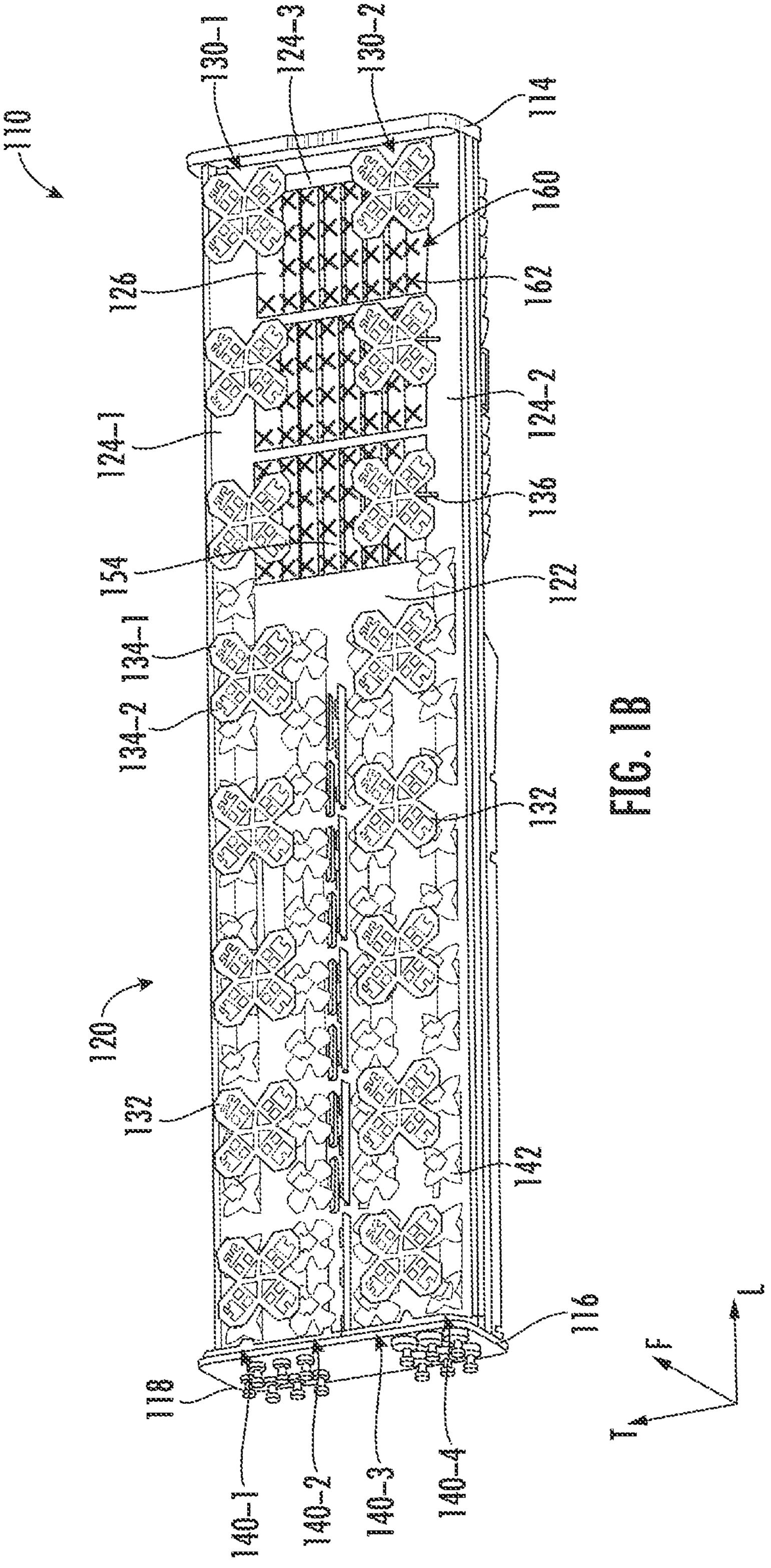
FIG. 1B is a schematic perspective view of the passive/active antenna system of FIG. 1A with a radome of the passive base station antenna removed.
Figure 1C:
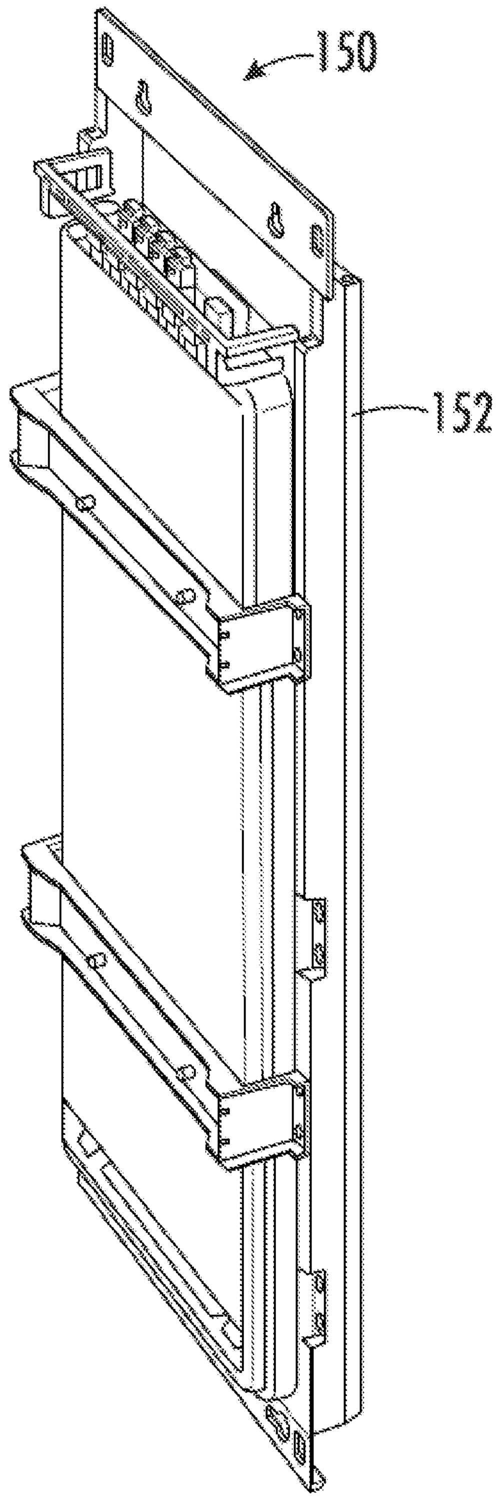
FIG. 1C is a perspective view of the active antenna module of the passive/active antenna of FIGS. 1A-1B.

FIGS. 1A-1C illustrate a passive/active antenna system 100 that includes both a passive base station antenna and an active antenna module. In particular, FIG. 1A is a schematic rear perspective view of the conventional passive/active antenna system 100. FIG. 1B is a schematic perspective view of the passive/active antenna system 100 of FIG. 1A with a radome of the passive base station antenna omitted. FIG. 1C is a perspective view of the active antenna module. In FIGS. 1A and 1B, the axes illustrate the longitudinal (L), transverse (T) and forward (F) directions of the base station antenna system 100.

Referring to FIG. 1A, the passive/active antenna system 100 may be mounted, for example, on an antenna tower 102 using mounting hardware 104. The passive/active antenna system 100 includes a passive base station antenna 110 and an active antenna module 150 that is mounted behind the passive base station antenna 110. The active antenna module 150 may be mounted directly on a rear surface of the passive base station antenna 110, or may be held in place behind the passive base station antenna 110 by the mounting hardware 104 that is used to mount the passive/active antenna system 100 on the antenna tower 102 (or other structure). The front surface of the passive/active antenna system 100 may be opposite the antenna tower 102 facing toward a coverage area of the passive/active antenna system 100. The passive base station antenna 110 includes a tubular radome 112 that surrounds and protects an antenna assembly that is mounted inside the radome 112. A top end cap 114 covers a top opening in the radome 112 and a bottom end cap 116 covers a bottom opening in the radome 112. A plurality of RF ports 118 extend through the bottom end cap 116 and are used to connect the passive base station antenna 110 to one or more external radios (not shown). The active antenna module 150 may be removably mounted behind the passive base station antenna 110 so that the active antenna module 150 may later be replaced with a different active antenna module, preferably without removing the passive base station antenna 110 from the antenna tower 102.

Referring to FIG. 1B, the passive base station antenna 110 includes a reflector assembly 120 and a plurality of passive linear arrays of radiating elements that extend forwardly from the passive reflector assembly 120. The reflector assembly 120 may be referred to herein as a "passive reflector assembly" since it is part of the passive base station antenna 110. The linear arrays may support, for example, 3G and/or 4G cellular service. In the example passive base station antenna 110 shown in FIGS. 1A-1B, the linear arrays include first and second low-band linear arrays 130-1, 130-2 that are configured to operate in all or part of the 617-960 MHz frequency band. Each low-band linear array 130 comprises a vertically-extending column of low-band radiating elements 132. The passive base station antenna 110 further includes first through fourth mid-band linear arrays 140-1 through 140-4 that are configured to operate in all or part of the 1427-2690 MHz frequency band. Each mid-band linear array 140 comprises a vertically-extending column of mid-band radiating elements 142. Each of the low-band and mid-band linear arrays 130, 140 may generate relatively static antenna beams that provide coverage to a predefined coverage area (e.g., antenna beams that are each configured to cover a sector of a base station), with the only change to the coverage area occurring when the electronic downtilt angles of the generated antenna beams are adjusted (e.g., to change the size of the cell).

As will be discussed in greater detail below, each of the low-band and mid-band radiating elements 132, 142 may be implemented as dual-polarized radiating elements that include first and second radiators that transmit and receive RF energy at orthogonal polarizations. When such dual-polarized radiating elements are used, each of the low-band and mid-band linear arrays 130, 140 may be connected to a pair of the RF ports 118. The first RF port 118 is connected between a first port of a radio (e.g., a remote radio head mounted on the antenna tower 102 near the passive base station antenna 110) and the first polarization radiators of the radiating elements in the array, and the second RF port 118 is connected between a second port of a radio and the second polarization radiators of the radiating elements in the array. RF signals that are to be transmitted by a selected one of the linear arrays 130, 140 are passed from the radio to one of the RF ports 118, and passed from the RF port 118 to a power divider (or, alternatively, a phase shifter assembly that includes a power divider) that divides the RF signal into a plurality of sub-components that are fed to the respective first or second radiators of the radiating elements in the linear array, where the sub-components are radiated into free space.

The passive reflector assembly 120 includes a main reflector 122 and spaced-apart first and second reflector strips 124-1, 124-2 that extend longitudinally from respective first and second opposed sides of the main reflector 122. The passive reflector assembly 120 may further include a third reflector strip 124-3 that extends in a transverse direction between the first and second reflector strips 124-1, 124-2. An opening 126 is defined between the first and second reflector strips 124-1, 124-2. For example, the opening 126 may be bounded by a top portion of the main reflector 122, the first and second reflector strips 124-1, 124-2, and the third reflector strip 124-3. Most of the low-band and mid-band radiating elements 132, 142 are mounted to extend forwardly from the main reflector 122. However, low-band linear arrays 130-1, 130-2 extend substantially the full length of the passive/active antenna system 100 and hence extend beyond the main reflector 122. The first and second reflector strips 124-1, 124-2 provide mounting locations for low-band radiating elements 132 that are positioned above the main reflector 122. The first and second reflector strips 124-1, 124-2 may be integral with the main reflector 122 so that the first and second reflector strips 124-1, 124-2 and the main reflector 122 will be maintained at a common ground voltage, which may be important for the performance of the low-band linear arrays 130-1, 130-2.

Each low-band radiating element 132 may comprise a slant −45°/+45° cross-dipole radiating element that includes a −45° dipole radiator 134-1 and a +45° dipole radiator 134-2 that are arranged to form a cross when the radiating element 132 is viewed from the front. The dipole radiators 134 may (but need not) extend in a plane that is parallel to a plane defined by the main reflector 122. The dipole radiators 134-1, 134-2 may be mounted on a feed stalk 136 of the radiating element 132. Conventionally, cross-dipole radiating elements extend forwardly from a main reflector surface of a reflector assembly with the feed stalks the radiating elements extending perpendicularly to the main reflector surface. The feed stalk may be configured to pass RF signals between the dipole radiators and an associated feed network, and may also be used to support the dipole radiators forwardly of the reflector assembly. The radiating elements 132 that extend forwardly from the main reflector 122 may have a conventional design where the feed stalks extend perpendicularly to the main reflector 122. However, the centers of the low-band radiating elements 132 that are mounted on the first and second reflector strips 124-1, 124-2 are above the opening 126, and hence conventional radiating elements cannot be readily used. Thus, the three uppermost low-band radiating elements 132 have so-called “tilted” feed stalks 136 that extend forwardly from the reflector strips 124-1, 124-2 at oblique angles. In particular, the base of each feed stalk 136 is mounted on one of the reflector strips 124-1, 124-2, and the feed stalk 136 extends at an angle so that the center of the cross defined by the dipole radiators 134-1, 134-2 is above the opening 126. In example embodiments, the feed stalks 136 may extend at an angle of about 30°-60° with respect to the front surface of the reflector strips 124-1, 124-2.

Referring to FIGS. 1B and 1C, the active antenna module 150 includes a multi-column beamforming array 160 of radiating elements 162 and a beamforming radio (not visible in the figures). The multi-column beamforming array 160 may be mounted in a forward portion of a radome 152 of the active antenna module 150, and the beamforming radio may be mounted behind the multi-column beamforming array 160. The beamforming array 160 may, for example, comprise a plurality of vertically-extending columns of high-band radiating elements 162 that are configured to operate in all or part of the 3.1-4.2 GHz frequency band. The high-band radiating elements 162 are mounted to extend forwardly from a reflector 154 of the active antenna module 150 (herein the “active reflector”). The beamforming radio is capable of electronically adjusting the amplitude and/or phase of the subcomponents of an RF signal that are output to different radiating elements 162 of the multi-column beamforming array 160. For example, each port of the beamforming radio may be coupled to a column of the beamforming array 160, and the amplitudes and phases of the sub-components of the RF signal that are fed to each column may be adjusted so that the generated antenna beam is narrowed in the azimuth plane and pointed in a desired direction in the azimuth plane. The active antenna module 150 may further include other components such as filters, a calibration network, an antenna interface signal group (AISG) controller and the like.

As is shown in FIG. 1B, the beamforming array 160 of active antenna module 150 is mounted behind the opening 126 in the passive reflector assembly 114. The beamforming array 160 is visible in FIG. 1B as the radomes 112, 152 of both the passive base station antenna 110 and the active antenna module 150 are removed in the view of FIG. 1B. The opening 126 in the passive reflector assembly 120 allows the antenna beams generated by the beamforming array 160 to pass through the passive base station antenna 110 and out of the front of the radome 112 of the passive base station antenna 110 to provide service to the coverage area of the passive/active antenna system 100.

Figure 2A:
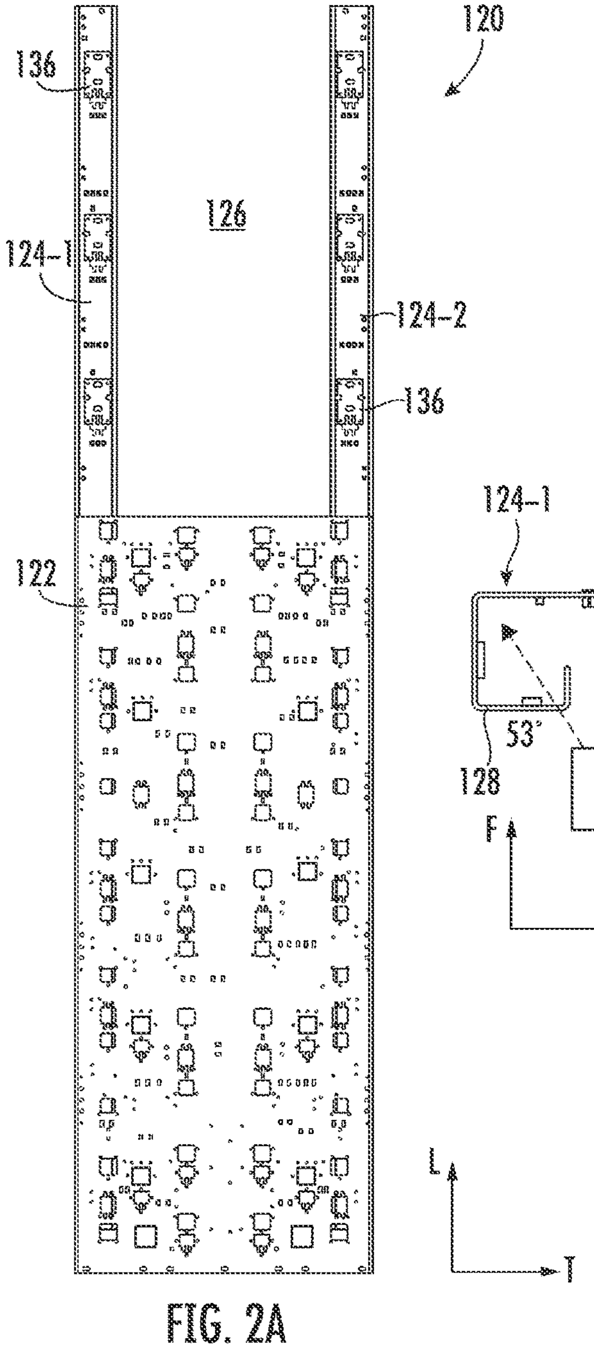
FIGS. 2A and 2B are a front view and a top view, respectively, of the passive reflector assembly of the passive/active antenna system of FIGS. 1A-1C.
Figure 2B:
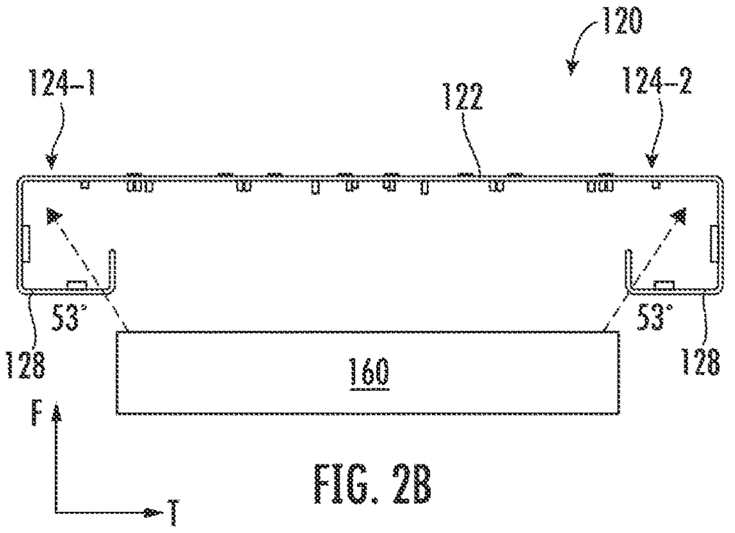

FIGS. 2A and 2B are a front view and a top view, respectively, of the passive reflector assembly 120 of the passive base station antenna 110. As shown in FIG. 2A, three feedboard printed circuit boards 136 are mounted on the first and second reflector strips 124-1, 124-2. Each feedboard printed circuit board 136 may have a low-band radiating element 132 (not shown) mounted thereon. As shown in FIG. 2A, the first and second reflector strips 124-1, 124-2 may each have a width in the transverse direction that is slightly wider than the widths of the feedboard printed circuit boards 136. This ensures that the feedboard printed circuit boards 136 have adequate structural support (so that they will not bend).

As shown in FIG. 2B, the passive reflector assembly 120 may be formed from a piece of sheet metal. Side edges of the metal sheet may be bent rearwardly through several 90° angles so that the side edges bend around and face forwardly toward the rear surface of the main reflector 122. This design forms an RF choke structure 128 along each side of the passive reflector assembly 120 that may help reduce the amount of RF energy that passes to the rear surface of the passive reflector assembly 120, thereby improving the front-to-back ratio performance of the linear arrays 130, 140 of the passive base station antenna 110. The RF choke structures 128 also enhance the structural support provided by the passive reflector assembly 120.

There are two potential problems with the passive reflector assembly 120 shown in FIGS. 2A-2B. First, the passive reflector assembly 120 typically serves as one of the main structural components of the passive/active antenna system 100, and hence should ensure that the passive base station antenna 110 remains sufficiently rigid and static, even when subjected to the very high wind loads that can be applied to antennas that are mounted atop tall antenna towers. Providing the large opening 126 in the passive reflector assembly 120 reduces the structural rigidity of the passive base station antenna 110, which may negatively impact RF performance. Second, as shown in FIGS. 2A and 2B, the active beamforming array 160 of active antenna module 150 may be mounted rearwardly of the first and second reflector strips 124-1, 124-2. Consequently, RF energy emitted by the active beamforming array 160 may reflect off the rear surface of the first and second reflector strips 124-1, 124-2, which reduces the magnitude of the forwardly-directed RF energy, and which also may result in undesired reflections that can negatively impact the shape of the generated antenna beams. The amount of RF energy that is reflected may be a function of the azimuth scanning angle of the active beamforming array 160, which refers to the azimuth angle corresponding to the peak gain of the generated antenna beam. As shown in FIG. 2B, when the azimuth scanning angle is large, a greater percentage of the RF energy may be reflected by either the first or second reflector strips 124-1, 124-2, which distorts the shape of the antenna beam and reduces the peak gain.

Figure 3A:
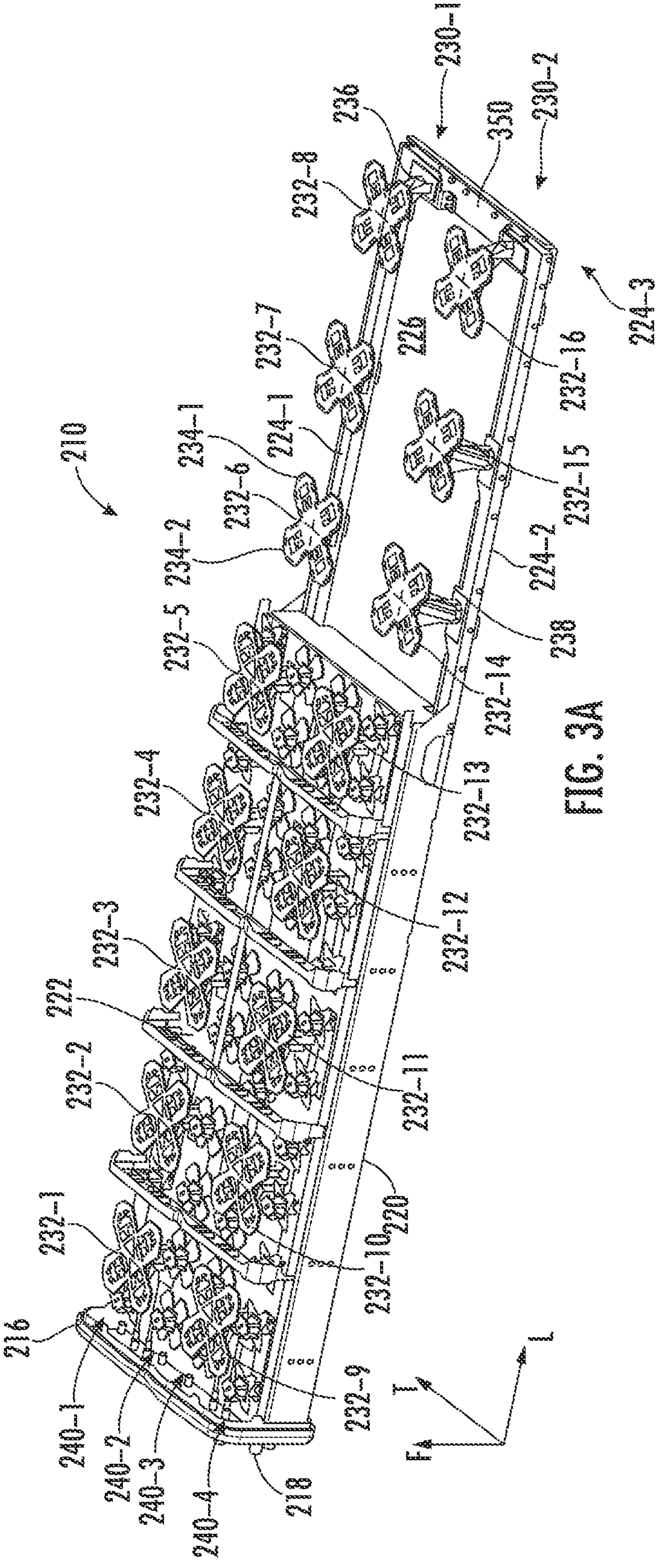
FIG. 3A is a perspective view of an antenna assembly of a passive base station antenna according to embodiments of the present invention.
Figure 3B:
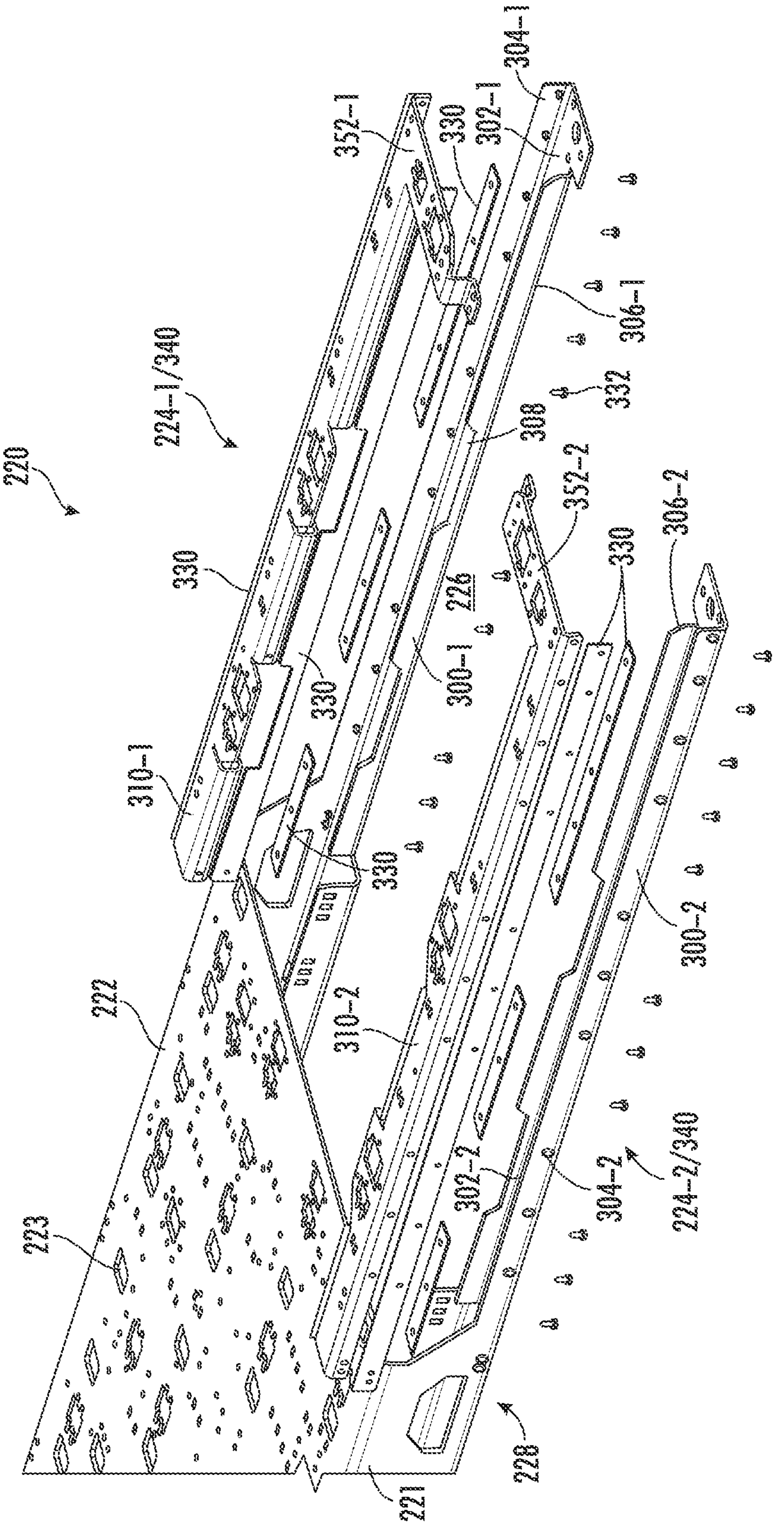
FIG. 3B is an exploded perspective view of an upper portion of the passive reflector assembly shown in FIG. 3A.
Figure 4A:
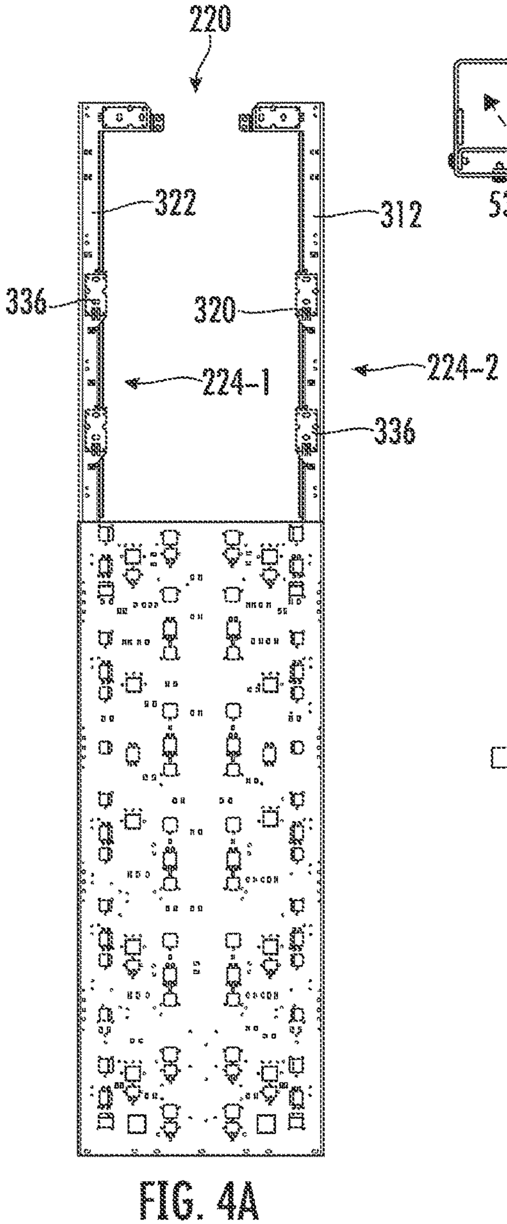
FIGS. 4A-4C are a front view, a top view and an enlarged partial top view, respectively, of a passive reflector assembly included in the passive/active antenna of FIGS. 3A-3B.
Figure 4B:
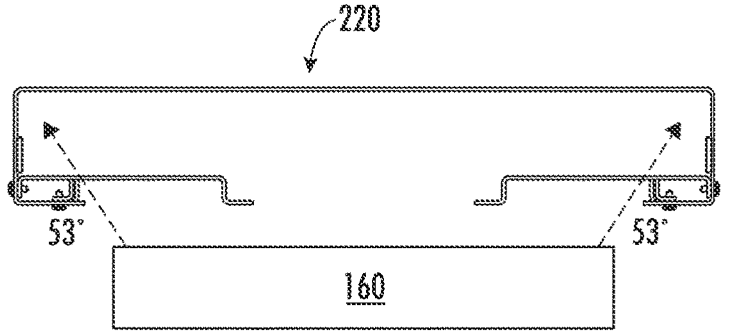
Figure 4C:
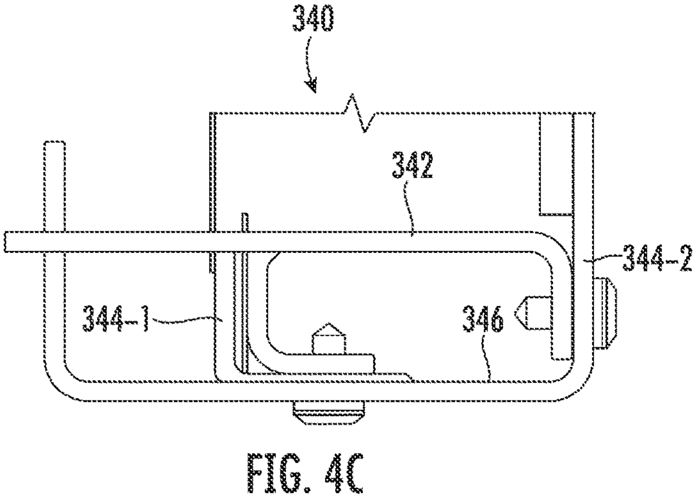
Figure 5A:
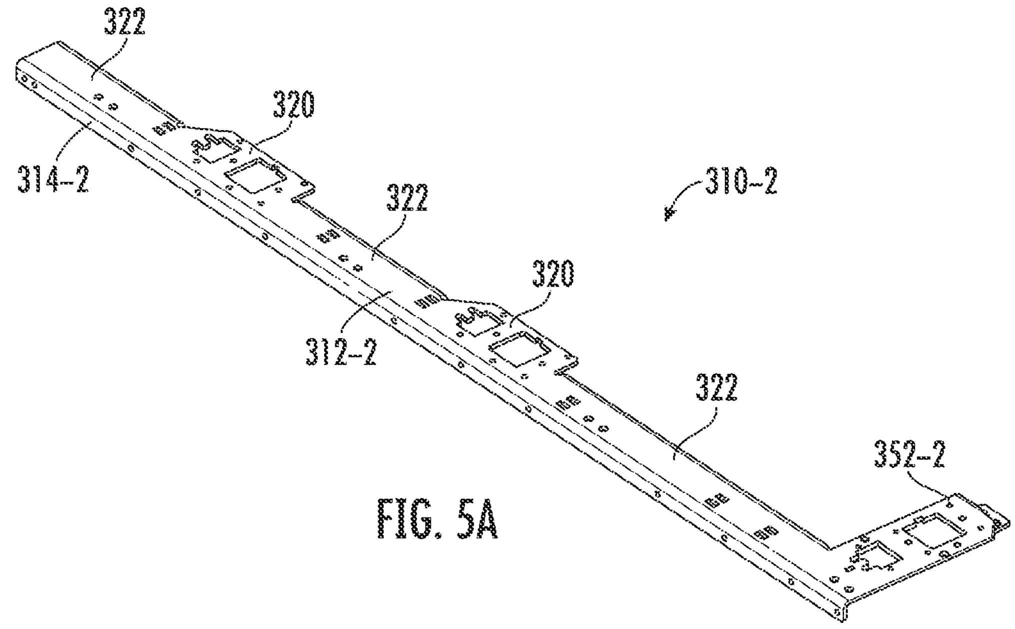
FIGS. 5A and 5B are front and rear views of a bent piece of sheet metal that forms a first auxiliary strip and part of a third reflector strip of the passive reflector assembly shown in FIGS. 4A-4B.
Figure 5B:
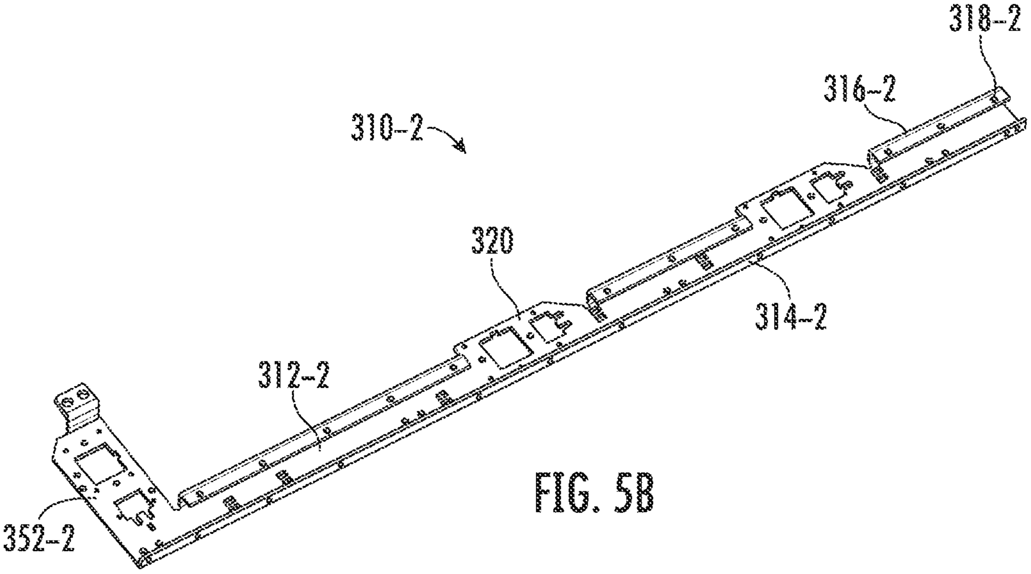

Pursuant to embodiments of the present invention, passive base station antennas having improved passive reflector assemblies are provided. The passive reflector assemblies according to embodiments of the present invention may provide enhanced structural support, and may have reduced impact on the antenna beams generated by the active beamforming array of an active antenna module mounted behind the passive base station antenna. An example embodiment of a passive base station antenna 210 (with the radome removed) that includes a passive reflector assembly according to embodiments of the present invention is illustrated in FIG. 3A-5B. In particular, FIG. 3A is a front perspective view of the passive base station antenna 210, and FIG. 3B is an exploded perspective view of an upper portion of a passive reflector assembly 220 included in the passive base station antenna 210 of FIG. 3A. FIGS. 4A-4C are a front view, a top view and an enlarged top view, respectively, of the passive reflector assembly 220 that illustrate how the passive reflector assembly may provide improved mechanical and RF performance. Finally, FIGS. 5A and 5B are enlarged front and rear views of a bent piece of sheet metal that is part of the passive reflector assembly 220. The passive base station antenna 210 of FIG. 3A may be used in place of the passive base station antenna 110 in the passive/active antenna system 100 of FIGS. 1A-1C.

Turning first to FIG. 3A, a perspective view of the antenna assembly of passive base station antenna 210 is provided. The radome of passive base station antenna 210 is omitted from view in FIG. 3A, as are selected other components to better illustrate the design of the passive reflector assembly 220 included in antenna 210. As shown in FIG. 3A, the passive reflector assembly 220 may extend substantially the entire length of antenna 210, and may be one of the primary structural components of the antenna 210. Support brackets (not shown) may extend across the back of the passive reflector assembly 220 to provide further structural support, as is known in the art. A bottom end cap 216 is mounted adjacent the bottom of the passive reflector assembly 220, and may be attached thereto. A plurality of RF ports 218 may extend through the bottom end cap 216. The RF ports 218 may comprise, for example, RF connectors, and the exposed end of each RF port 218 may be connected to a port of a radio.

As shown best in FIG. 3B, the passive reflector assembly 220 includes a main reflector 222. The main reflector 222 may comprise a substantially planar sheet of metal that extends in the longitudinal direction of the passive base station antenna 210. A front surface of the main reflector 222 serves as a reflector and ground plane for the radiating elements mounted to extend forwardly therefrom. A plurality of small openings 223 may be provided in the main reflector 222. Some of the openings 223 may be provided at the locations where each radiating element of the passive base station antenna 210 will be mounted to allow rearwardly protruding feed stalks of such radiating elements to extend into and/or through the openings 223. Openings 223 may also be provided that receive rivets (or other attachment structures) that are used to mount components such as feed boards, decoupling structures, isolation structures and/or structural supports to the main reflector 222, or to allow coaxial cables to pass through the main reflector 222.

As is further shown in FIG. 3B, spaced-apart first and second reflector strips 224-1, 224-2 extend longitudinally from, and merge into, respective first and second opposed sides of the main reflector 222. The first and second reflector strips 224-1, 224-2 may be tubular reflector strips. An opening 226 is defined between the first and second reflector strips 224-1, 224-2. As shown in FIG. 3A, a transversely-extending third reflector strip 224-3 may extend between and connect upper ends of the first and second longitudinally-extending reflector strips 224-1, 224-2. In the depicted embodiment, the opening 226 is bounded by a top portion of the main reflector 222, the longitudinally-extending first and second reflector strips 224-1, 224-2, and the transversely-extending third reflector strip 224-3.

As can best be seen in FIG. 3B, a single piece of sheet metal 221 may be used to form much of the passive reflector assembly 220. Side edges of the sheet 221 may be bent rearwardly at an angle of about 90° to form rearwardly extending sidewalls. Ends of these sidewalls may then be bent inwardly at an angle of about 90° and then bent again at an angle of about 90° so that the endmost portion of each side edge extends forwardly toward the main reflector 222 and is perpendicular thereto. The bent portions along each side edge of sheet 221 may be designed to form RF chokes 228 that may help reduce the amount of RF energy that passes to the rear surface of the passive reflector assembly 220, thereby improving the front-to-back ratio performance of the passive base station antenna 210. The RF chokes 228 also enhance the structural support provided by the passive reflector assembly 220. The RF chokes 228 are positioned rearwardly of the main reflector 222.

The first and second reflector strips 224-1, 224-2 are integral or "monolithic" with the main reflector 222 (i.e., they are all formed from a single piece of sheet metal). As a result, the first and second reflector strips 224-1, 224-2 and the main reflector 222 will be maintained at a common voltage. This may be important for the performance of the low-band linear arrays (discussed below) since these arrays include radiating elements that are mounted to extend forwardly of both the main reflector 222 and the reflector strips 224. As shown best in FIG. 3A, in some embodiments, front surfaces of the first and second reflector strips 224-1, 224-2 extend in a first plane that is positioned rearwardly of a plane defined by a front surface of the main reflector 222. This advantageously positions the first and second reflector strips 224-1, 224-2 closer (in the front-to-rear direction) to the beamforming array 160 of the active antenna module 150, and hence reduces the extent to which the first and second reflector strips 224-1, 224-2 may block RF energy emitted by the beamforming array 160.

Referring again to FIG. 3A, the passive base station antenna 210 further includes a plurality of passive linear arrays of radiating elements that extend forwardly from the passive reflector assembly 220. The passive linear arrays may support, for example, 3G and/or 4G cellular service. The passive linear arrays include first and second low-band linear arrays 230-1, 230-2 that are configured to operate in all or part of the 617-960 MHz frequency band, and first through fourth mid-band linear arrays 240-1 through 240-4 that are configured to operate in all or part of the 1427-2690 MHz frequency band. Each low-band linear array 230 comprises a vertically-extending column of eight low-band radiating elements 232. The low-band passive linear arrays 230 extend the full length of the passive base station antenna 210. Low-band radiating elements 232-1 through 232-5 and 232-9 through 232-13 extend forwardly from the main reflector 222. Low-band radiating elements 232-6, 232-7 and 232-14, 232-15 extend forwardly from a respective one of the longitudinally extending first and second reflector strips 224-1, 224-2. Low-band radiating element 232-8 and 232-16 extend forwardly from the transversely-extending third reflector strip 224-3. The low-band radiating elements 232 in each low-band array 230 may be aligned along a vertical axis to form a pair of vertically-extending columns of low-band radiating elements 232.

Each of the low-band and mid-band linear arrays 230, 240 may generate relatively static antenna beams that provide coverage to a predefined coverage area (e.g., antenna beams that are each configured to cover a sector of a base station), with the only change to the coverage area occurring when the electronic downtilt angles of the generated antenna beams are adjusted (e.g., to change the size of the cell).

Each low-band radiating element 232 may comprise a slant −45°/+45° cross-dipole radiating element that includes a −45° dipole radiator 234-1 and a +45° dipole radiator 234-2 that are arranged to form a cross when the radiating element 232 is viewed from the front. The dipole radiators 234 may (but need not) extend in a plane that is parallel to a plane defined by the main reflector 222. The dipole radiators 234-1, 234-2 of each radiating element 232 are mounted on a feed stalk 236 of the respective radiating elements 232. The feed stalks 236 for low-band radiating elements 232-1 through 232-5 and 232-9 through 232-13 extend perpendicularly with respect to the plane defined by the main reflector 222. In contrast, the feed stalks 236 for low-band radiating elements 232-6 through 232-8 and 232-14 through 232-16 extend at oblique angles with respect to the plane defined by the main reflector 222. This allows the base of each feed stalk 236 to be mounted on one of the reflector strips 224 (which are adjacent the side or top of the antenna 210) while the distal ends of the feed stalks 236 are positioned inwardly from the base above the opening 226. Such feed stalks 236, which have distal ends that are not aligned with their bases along the forward direction, are referred to herein as "tilted" feed stalks 236. In example embodiments, the tilted feed stalks 236 may extend at an angle of about 30°-60° with respect to the plane defined by the main reflector 222, although other angles may be used. The aforementioned '718 publication discloses a wide variety of designs for radiating elements having tilted feed stalks. Any of the radiating elements disclosed in the '718 publication may be used to form the low-band radiating elements 232 that have radiators that are mounted in front of the opening 226 in the passive reflector assemblies according to embodiments of the present invention.

The bases (i.e., the rearward ends) of the feed stalks 236 of the low-band radiating elements 232 are adjacent the passive reflector assembly 220, as each radiating element 232 is mounted on a feedboard printed circuit board 238 that in turn is mounted on the passive reflector assembly 220. The dipole radiators 234 of low-band radiating elements 232 are adjacent the distal end of the respective feed stalks 236 (and typically mounted thereon). Since the feed stalks 236 of low-band radiating elements 232-6 through 232-8 and 232-14 through 232-16 are tilted, a center of each dipole radiator 234 of low-band radiating elements 232-6 through 232-8 and 232-14 through 232-16 is offset from the base of its associated feed stalk 236. For low-band radiating elements 232-8 and 232-16, the center of each dipole radiator 234 is offset from the base of its associated feed stalk 236 in the longitudinal direction. In contrast, for low-band radiating elements 232-6, 232-7 and 232-14, 232-15, the center of each dipole radiator 234 is offset from the base of its associated feed stalk 236 in the transverse direction. Thus, the feed stalks 236 of low-band radiating elements 232-8 and 232-16 each extend forwardly from the third reflector strip 224-3 in respective first planes and the feed stalks of low-band radiating elements 232-6, 232-7 and 232-14, 232-15 extend forwardly from the first or second reflector strips 224-1, 224-2 in respective second planes, where each first plane is substantially perpendicular to the second planes.

As can also be seen from FIG. 3A, the feed stalks 236 of low-band radiating elements 232-6 through 232-8 and 232-14 through 232-16 each extend forwardly from one of the reflector strips 224-1 through 224-3 at respective oblique angles (typically angles between 30° and 60°). The feed stalks of radiating elements 232-8 and 232-16 are tilted in a longitudinal direction, while the feed stalks 236 of radiating elements 232-6, 232-7 and 232-14, 232-15 are tilted in a transverse direction.

Each of the low-band linear arrays 230 is connected to a pair of the RF ports 218 via respective first and second feed networks (not shown). For example, for low-band linear array 230-1, a first of the RF ports 218 is connected to the first polarization radiators of the radiating elements 232 in the array 230-1 by a first feed network, and a second of the RF ports 218 is connected to the second polarization radiators of the radiating elements 232 in the array 230-1 by a second feed network. Each feed network may include a phase shifter assembly that sub-divides RF signals received from the RF port 218 into a plurality of sub-components, and that further imparts a phase progression to the sub-components so that the generated antenna beam will have a desired amount of electrical downtilt in the elevation plane, as is well understood by those of ordinary skill in the art. Each sub-component is then fed to one (or split between two) of the low-band radiating elements 232 in array 230-1, which radiate the sub-components into free space.

Each mid-band linear array 240 includes twelve mid-band radiating elements 242 that are arranged in respective vertically-extending columns. The mid-band linear arrays 240 do not extend the full length of the passive base station antenna 210, and instead only extend for the length of the main reflector 222. Thus, all of mid-band radiating elements 242 extend forwardly from the main reflector 222.

The passive reflector assembly 220 includes a revised design that may improve both the mechanical and electrical performance as compared to the passive reflector assembly 120 of passive base station antenna 110 that is described above. In particular, as is shown in FIG. 3B, the first and second reflector strips 224-1, 224-2 comprise multi-piece structures that each include an integrated strip 300, an auxiliary strip 310 and a plurality of gaskets 330. For example, reflector strip 224-1 includes a first integrated strip 300-1 that comprises an extension of the first RF choke 228. The first integrated strip 300-1 is integral with the main reflector 222. The main reflector 222, the RF chokes 228, and the first and second integrated strips 300-1, 300-2 may all be formed from a single piece of stamped sheet metal that is bent into the shape shown in FIGS. 3A and 3B. The first integrated strip 300-1 includes a rear wall 302-1 an outer side wall 304-1 and an inner sidewall 306-1. The outer and inner sidewalls 304-1, 306-1 each extend forwardly from the rear wall 302-1. As shown in FIG. 3B, the width of the rear wall 302-1 in the transverse direction may be less than the width of the rear wall of the RF choke 228. The inner sidewall 306-1 may include one or more recesses 308 where the inner sidewall 306-1 does not extend as far forwardly as other portions of the inner sidewall 306-1. The recesses 308 ensure that the feed stalks of radiating elements mounted forwardly of the first integrated strip 300-1 do not contact the inner sidewall 306-1.

The first and second auxiliary strips 310-1, 310-2 may each be formed from stamped sheet metal that is formed (bent) into the shapes shown in FIG. 3B. Enlarged views of the second auxiliary strip 310-2 are provided at FIGS. 5A-5B, so the discussion below focuses on the second auxiliary strip 310-2. As shown in FIG. 3B, the second auxiliary strip 310-2 is mounted on the second integrated strip 300-2. Referring now to FIGS. 5A-5B, the second auxiliary strip 310-2 includes a front wall 312-2 that is parallel to the main reflecting surface of the main reflector 222, an outer sidewall 314-2, an inner sidewall 316-2, and a rear wall 318-2 that is attached to a rear end of the inner sidewall 316-2. The outer and inner sidewalls 314-2, 316-2 extend rearwardly from the front wall 312-2, and the rear wall 318-2 is parallel to the main reflecting surface of the main reflector 222. The second auxiliary strip 310-2 is mounted forwardly of the second integrated strip 300-2 and may be attached thereto. A plurality of dielectric gaskets 330 are provided that prevent direct metal-to-metal contact between the second auxiliary strip 310-2 and the second integrated strip 300-2 in order to prevent a junction between the second auxiliary strip 310-2 and the second integrated strip 300-2 from being a potential source of PIM distortion. The gaskets 330 may comprise, for example, thin strips of insulating material such as polyester or flame retardant polyester.

The outer sidewall 314-2 of the first auxiliary strip 310-2 may abut the outer sidewall 304-2 of the second integrated strip 300-2, and a dielectric gasket 330 may be disposed therebetween. Dielectric rivets 332 may be used to attach the outer sidewall 314-2 of the second auxiliary strip 310-2 to the outer sidewall 304-1 of the second integrated strip 300-2. The inner sidewall 316-2 of the second auxiliary strip 310-2 may similarly abut the inner sidewall 306-2 of the second integrated strip 300-2, and another dielectric gasket 330 may be disposed therebetween. The rear wall 318-2 of the second auxiliary strip 310-2 may abut the rear wall 302-2 of the second integrated strip 300-2, and one or more dielectric gaskets 330 may be disposed therebetween. Additional dielectric rivets 332 may be used to attach the rear wall 318-2 of the second auxiliary strip 310-2 to the rear wall 302-2 of the second integrated strip 300-2.

As shown best in FIG. 4C, the second integrated strip 300-2 and the second auxiliary strip 310-2 together form a tubular structure 340 that has a front wall 342, a pair of sidewalls 344-1, 344-2 and a rear wall 346. The tubular structure 340 may exhibit increased strength and rigidity as compared to the reflector strips 124 of passive reflector assembly 120. As such, the width of both the second integrated strip 300-2 and of the second auxiliary strip 310-2 in the transverse direction may be reduced significantly from the width of the second reflector strip 124-2 while providing at least an equivalent level of structural support. As will be discussed below, this may improve the RF performance of any beamforming array 160 mounted behind the opening 226.

The front surface 312-2 of the second auxiliary strip 310-2 includes a pair of widened sections 320 that are interposed between narrowed sections 322 of the front surface 312-2. Each widened section 320 is widened in the transverse direction as compared to the remainder of the second auxiliary strip 310-2 (except for the distal end portion). As shown in FIG. 4A, a feedboard printed circuit board 336 may be mounted on each of the widened sections 320. Each feedboard printed circuit board 336 may have a low-band radiating element 236 mounted thereon so that the low-band radiating elements 236 extend forwardly from the feedboard printed circuit boards 336. The widened sections 320 may have a width that is approximately equal to the widths of the feedboard printed circuit boards 336 mounted thereon. The widened sections 320 may ensure that the feedboard printed circuit boards 336 have sufficient mechanical support. The narrowed sections 322 may have widths in the transverse direction that are less than the widths of the feedboard printed circuit boards 336. The inner sidewall 316-2 of the second auxiliary strip 310-2 is not present (i.e., does not extend) in the regions behind the widened portions of the front surface 312-2, as can best be seen in FIG. 3B.

Referring to FIGS. 3A and 3B, the third reflector strip 224-3 is formed from three transversely-extending pieces of metal 350, 352-1, 352-2. In particular, the first auxiliary strip 310-1 of the first longitudinally-extending reflector strip 324-1 includes a first integral transverse strip or "extension" 352-1 that extends inwardly from a distal (upper) end thereof. The second auxiliary strip 310-2 of the second longitudinally-extending reflector strip 224-2 similarly includes a second integral transverse strip or extension 3520-2 that extends inwardly from a distal (upper) end thereof. A crossbar 350 is also provided that extends between and is connected to (e.g., by screws or rivets) the distal (upper) ends of the first and second reflector strips 224-1, 224-2. The first and second integral transverse extensions 352-1, 352-2 may be attached to the crossbar 350. Thus, an upper edge of the main reflector 222, the first and second reflector strips 224-1, 224-2, and the third reflector strip 224-3 may frame the opening 326.

As discussed above with reference to FIGS. 1B and 1C, an active antenna module such as active antenna module 150 may be mounted behind the opening 226 in the passive reflector assembly 220. The active antenna module 150 may include a multi-column beamforming array 160 of radiating elements 162 and an active beamforming radio. The active antenna module 150 may transmit and receive RF signals through the opening 226.

FIGS. 4A and 4B are a front view and a top view, respectively, of the passive reflector assembly 220 of passive base station antenna 210. As shown in FIG. 4A, feedboard printed circuit boards 336 are mounted on each of the widened sections 320 included on the front wall 312 of the respective first and second auxiliary strips 310. The remainder of the first and second reflector strips 224-1, 224-2 may have a width that corresponds to the narrowed sections 322 of the front surface 312 of the auxiliary strips 310. Moreover, the widened sections 320 only comprise about 25% of the length of each of the first and second reflector strips 224-1, 224-2. As such, the width in the transverse direction for about 75% of the opening 226 is expanded as compared to the opening 126 included in passive reflector assembly 120 of FIGS. 2*a*-2*b*. As shown in FIG. 4B, this means that the width of about 75% of the opening may be increased. As a result, less RF energy emitted by the beamforming array 160 will reflect off the rear surface of the first and second reflector strips 224-1, 224-2, and hence the passive reflector assembly 220 will have less of a negative impact on the RF performance of the beamforming array 160.

As is best shown in FIGS. 3A and 4A, the uppermost low-band radiating elements 232-8, 232-16 in each low-band arrays 230-1, 230-2 are mounted on the third reflector strip 224-3 rather than on the first or second reflector strips 224-1, 224-2. As a result, only two widened sections 320 are needed in each auxiliary strip 310, which allows a greater proportion of the opening 226 to have the increased width. In order to ensure that the dipole radiators 234 of the uppermost low-band radiating elements 232-8, 232-16 are in the proper location, the feed stalks 236 for these radiating elements 232-8, 232-16 are tilted downwardly so that the distal end of each feed stalk 236 will be lower than the base of the feed stalk 236 when the passive base station antenna 210 is mounted for use. In contrast, the feed stalks 236 for the radiating elements 232-6, 232-7 and 232-14, 232-15 mounted on the first and second longitudinally-extending reflector strips 224-1, 224-2 are tilted inwardly so that the distal end of each feed stalk 236 will be in front of the opening 226. Due to the tilted feed stalks 236, at least half of each dipole radiator 234-1, 234-2 of radiating elements 232-6 through 232-8 and 232-14 through 232-16 overlaps the opening 226 in a direction perpendicular to the main reflector 222 (i.e., when viewing the passive base station antenna 210 from the front, at least half of each dipole radiator 234-1, 234-2 will be in front of the opening 226).

In some embodiments, a frequency selective surface ("FSS") may be positioned in the opening 226. The FSS may be coplanar with the opening 226, in front of the opening 226 or behind the opening 226. The FSS can have a grid pattern such as a grid pattern of metal patches and/or other metal structures. The metal patches/structures may be arranged in one or more layers. In some embodiments, the FSS may be formed on a substrate such as, for example, a printed circuit board. In other embodiments, the FSS may be formed in sheet metal. In some embodiments, the opening 226 may comprise an FSS that is formed in the metal sheet 221. While in such embodiments the opening 226 is a non-conventional opening in that it comprises a large plurality of small openings formed in the metal sheet 221, it is still considered an opening for purposes of the present disclosure as the FSS structure will be substantially invisible to RF energy emitted by the beamforming array 160 (as will be discussed below), and hence with respect to such RF energy the FSS structure is the equivalent of a single large physical opening in the metal sheet 221.

As noted above, the FSS may be configured to allow RF energy emitted by the high band radiating elements 162 in the beamforming array 160 to pass therethrough, while the FSS reflects RF energy in lower frequency bands (and specifically, low-band RF signals that are emitted by the low-band radiating elements 232. The grid pattern can be arranged in any suitable manner and may be symmetric or asymmetric across a width and/or length of the FSS. The grid pattern may comprise sub-wavelength periodic microstructures.

FIGS. 6A-6D illustrate a passive reflector assembly 420 according to further embodiments of the present invention that may be used in place of the passive reflector assembly 220. The same arrays of radiating elements may be mounted on passive reflector assembly 420 (in the same positions and orientations) as are mounted on passive reflector assembly 220.

Figure 6A:
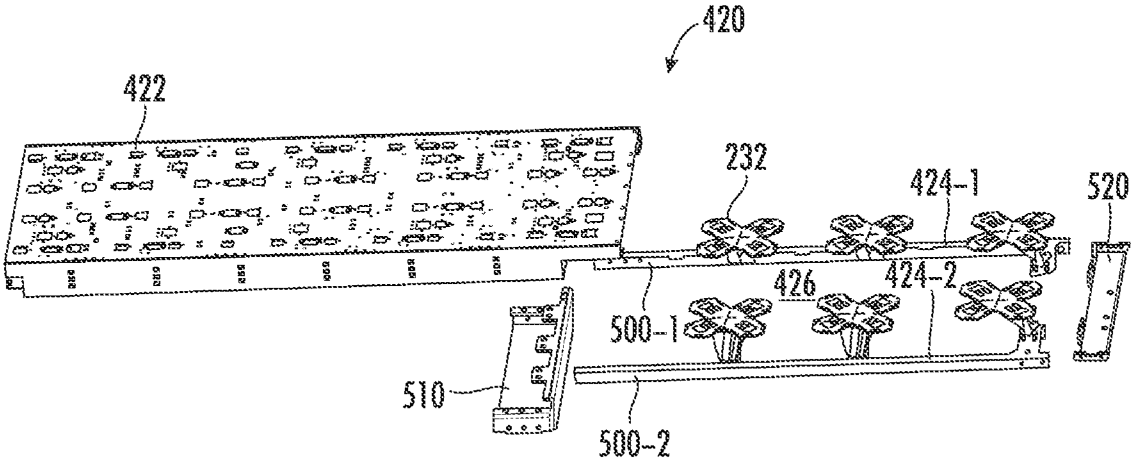
FIGS. 6A-6D are various views of a passive reflector assembly according to further embodiments of the present invention.
Figure 6B:
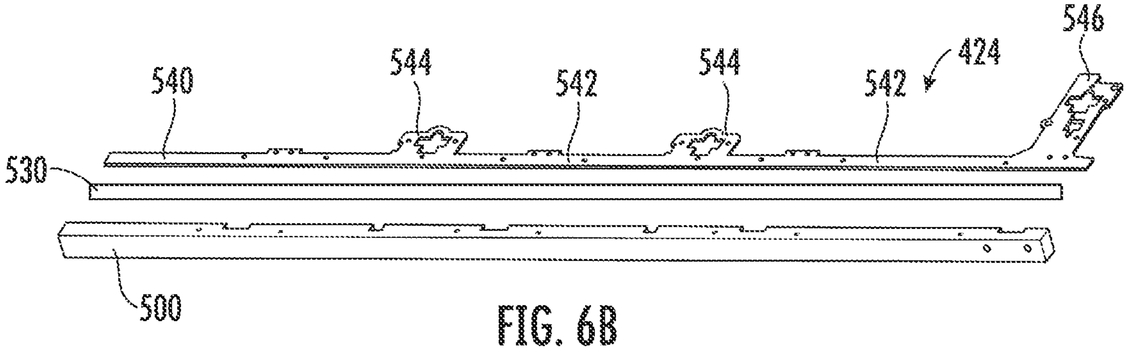
Figure 6C:
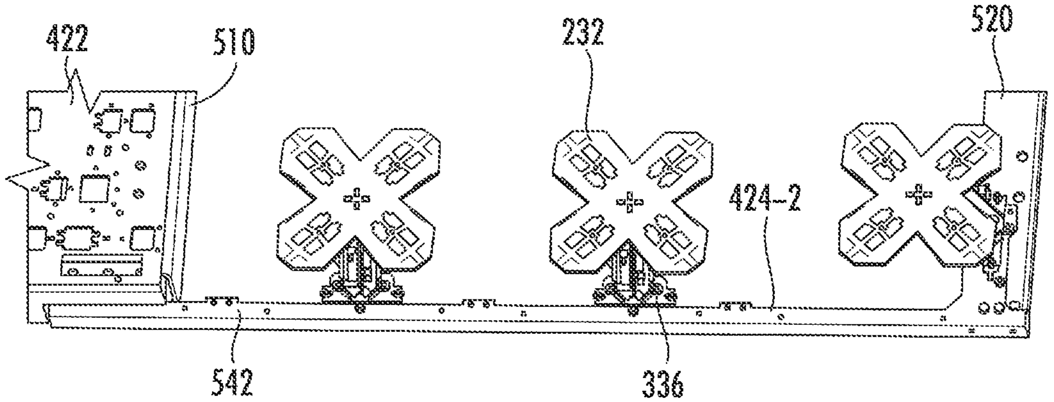
Figure 6D:
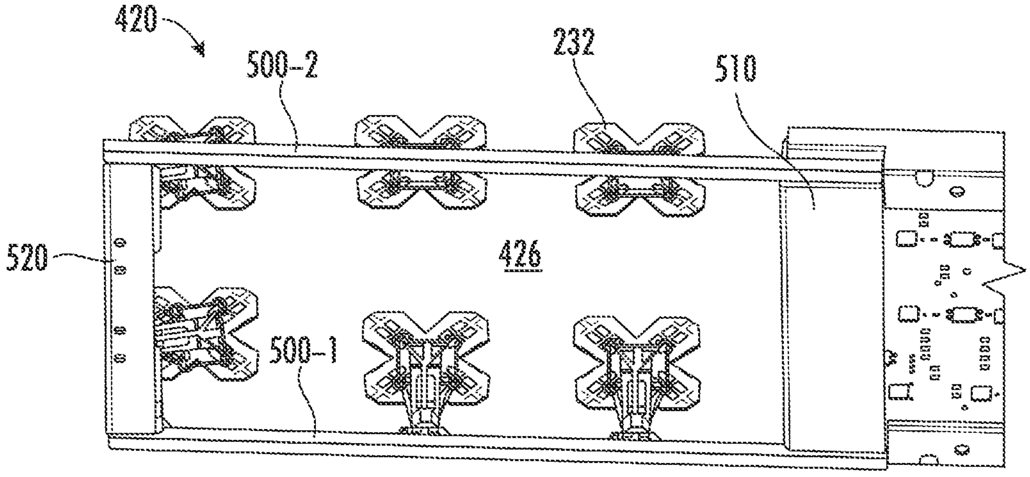

Turning to the drawings, FIG. 6A is an exploded perspective view of the passive reflector assembly 420 with several of the radiating elements 232 of each low-band array 230 mounted thereon. FIG. 6B is an exploded, partial perspective view of the passive reflector assembly 420 illustrating how each reflector strip 424 of a main reflector 422 thereof may be mounted on an associated rail 500. FIG. 6C is an enlarged, front perspective view of an upper portion of the passive reflector assembly 420 that illustrates how feed boards can be mounted on widened sections of the reflector strips 424. Finally, FIG. 6D is an enlarged, rear perspective view of the upper portion of the passive reflector assembly 420. The discussion below will focus on elements of the passive reflector assembly 420 that differ from the passive reflector assembly 220, and like elements of passive reflector assemblies 220, 420 will not be discussed further.

Referring to FIG. 6A, the passive reflector assembly 420 includes a main reflector 422. The main reflector 422 may be identical to the main reflector 222 except that it includes reflector strips 424-1, 424-2 that are planar rather than tubular and that are narrower in the transverse direction than the reflector strips 224-1, 224-2 of main reflector 222. The reflector strips 424-1, 424-2 may merge into (so as to be monolithic with) the main reflector 422 in some embodiments and may define an opening 426 therebetween.

Referring to FIG. 6B, each reflector strip 424 includes a main longitudinally-extending section 540 and an integral transverse strip 546 that extends inwardly from a distal (upper) end of the main longitudinally-extending section 540. Each main longitudinally-extending section 540 includes a pair of widened sections 544 that are interposed between narrowed sections 542. Each widened section 544 is widened in the transverse direction as compared to the remainder of the reflector strip 424 (except for the distal end portion), and may have a width that is approximately equal to widths of the feedboard printed circuit boards 336. As shown in FIGS. 6A, 6C and 6D, respective feedboard printed circuit boards 336 (and low-band radiating elements 236) may be mounted on each widened section 540. Moreover, the uppermost low-band radiating element 232 in each low-band arrays 230 is mounted on the transverse strip 546 of each reflector strip 424. As a result, only two widened sections 544 are needed on each longitudinally-extending section 540, which allows a greater proportion of the opening 426 to have the increased width.

Referring again to FIGS. 6A-6B, a pair of rails 500-1, 500-2 are provided. The rails 500-1, 500-2 may comprise, for example, first and second aluminum extrusions that are mounted directly behind the respective first and second reflector strips 424-1, 424-2. A gasket 530 (e.g., thin strips of insulating material such as polyester or flame retardant polyester) may be interposed between each rail 500 and its associated reflector strip 424 to prevent direct metal-to-metal contact therebetween. Rivets may be used to attach each rail 500 to its associated reflector strip 424 with the gaskets 530 captured therebetween.

Referring to FIGS. 6A and 6D, lower and upper transversely-extending brackets 510, 520 are provided. Lower bracket 510 may be attached to the main reflector 422, and lower ends of the rails 500 may be connected to lower bracket 510. In some embodiments, the rails 500 may be welded to the lower bracket 510, while in other embodiments, the rails 500 may be received within channels in lower bracket 510 and/or attached thereto using rivets. The upper bracket 520 may be similar to the crossbar 350 discussed above, and may extend between and connect upper ends of the first and second longitudinally-extending reflector strips 424-1, 424-2. The integral transverse extensions 546 of the reflector strips 424 may be attached to the upper bracket 520 (e.g., by screws or rivets). Thus, an upper edge of the main reflector 422, the first and second reflector strips 424-1, 424-2 (and associated rails 500) and the upper bracket 520 may frame the opening 426.

The rails 500 of passive reflector assembly 420 and the tubular structures 340 of passive reflector assembly 220 may exhibit comparable strength and rigidity. However, the width of each rail 500 in the transverse direction, which may match the width of the narrowed sections 542 of the reflector strips 424, may be less than the widths of the tubular structures 340 of passive reflector assembly 220 so that opening 426 is larger than opening 226. The enlarged opening 426 may further improve the RF performance of the beamforming array 160 mounted behind the opening 426.

While the above-discussed passive reflector assemblies according to embodiments of the present invention can dramatically improve the performance of the beamforming array 160 included in the active antenna module 150, in many applications the beamforming array 160 may need to scan the generated antenna beams to very wide angles in the azimuth plane, such as angles of 50° or more. When the peak of the antenna beam generated by the beamforming array 160 is scanned to a large electronic scanning angle, the antenna beam is pointed more toward one of the two sides of the passive reflector assembly, which tends to increase the amount of the RF radiation that is directed toward the longitudinally-extending reflector strip on that side of the antenna. Since the reflector strip is formed of metal, the RF radiation that impinges on the reflector strip is typically reflected backwardly, which acts to decrease the gain of the antenna beam, and which may also result in further reflections that can cause destructive cancellation, further degrading performance. The reflector strip will primarily reflect the RF radiation emitted by the outer columns of the beamforming array that are closest to the reflector strip on the side of the passive reflector assembly to which the antenna beam is being electronically scanned. As discussed above, the passive reflector assemblies according to embodiments of the present invention have widened openings between the longitudinally-extending reflector strips, which helps reduce the extent to which the reflector strips degrade the performance of the beamforming array 160. However, in some applications (and particularly applications that require very wide electronic scanning in the azimuth plane), the reflector strips may still unacceptably impact the performance of the beamforming array 160.

Another potential complication is that in some applications, the outer mid-band linear arrays (e.g., linear arrays 240-1 and 240-4 in FIG. 3A) may need to extend the full length of the passive reflector assembly 220 so that the generated antenna beams will have narrower elevation beamwidths. However, when these mid-band arrays 240-1 and 240-4 are extended the full length of the passive reflector assembly 220, the number of radiating elements mounted on each reflector strip 224-1, 224-2 typically triples (since the mid-band radiating elements 242 are typically spaced apart by about half the distance at which the low-band radiating elements 232 are spaced apart, so two mid-band radiating elements 242 may be added for each low-band radiating element 232). Thus, for example, a passive reflector assembly such as reflector assembly 220 that has three low-band radiating elements 232 mounted on each reflector strip 224-1, 224-2 would typically have nine radiating elements 232, 242 mounted on each reflector strip 224-1, 224-2 if the outer mid-band linear arrays 240-1, 240-4 were expanded to extend the fill length of the passive reflector assembly 220. As discussed above, the portions (e.g., portions 310) of the reflector strips 224 where the radiating elements 232, 242 are mounted are widened so that the reflector strips 224 fully support the feedboards for the radiating elements 232, 242. Thus, when the outer mid-band linear arrays 240-1, 240-4 are extended, the width of the opening 226 in the passive reflector assembly 220 is effectively narrowed along a significant portion of the length of the opening, as the reflector strips 224 are widened (which narrows the opening) to accommodate the additional feedboards for the mid-band radiating elements 242.

Pursuant to further embodiments of the present invention, base station antennas are provided that include passive reflector assemblies that have longitudinally-extending reflector strips that each include one or more auxiliary strips that are formed of dielectric materials. These dielectric auxiliary strips may be mounted on the longitudinally-extending reflector strips, and the radiating elements that extend on either side of the opening in the passive reflector assembly for the beamforming array may be mounted on the dielectric auxiliary strips. The use of these dielectric auxiliary strips may improve the performance of the high-band array in at least two ways. First, when these dielectric auxiliary strips are used, the need for the longitudinally-extending metal reflector strips to have inner sidewalls may be reduced or eliminated, as the dielectric auxiliary strips may perform the support function of the inner sidewalls of the reflector strips. This is advantageous because, in practice, the inner sidewalls of the longitudinally-extending reflector strips may be the primary element of the reflector strips that reflects radiation emitted by the beamforming array 160. Second, while the ground planes on the feedboards for the radiating elements 232, 242 that are mounted on the longitudinally-extending reflector strips 224-1, 224-2 of the passive reflector assembly 220 may still reflect radiation emitted by the beamforming array 160, the ground planes on the feedboards may be designed to cover less than half the area of the support surface of the dielectric auxiliary strips, and hence the amount of RF radiation from the beamforming array 160 that is reflected may be further reduced.

Figure 7A:
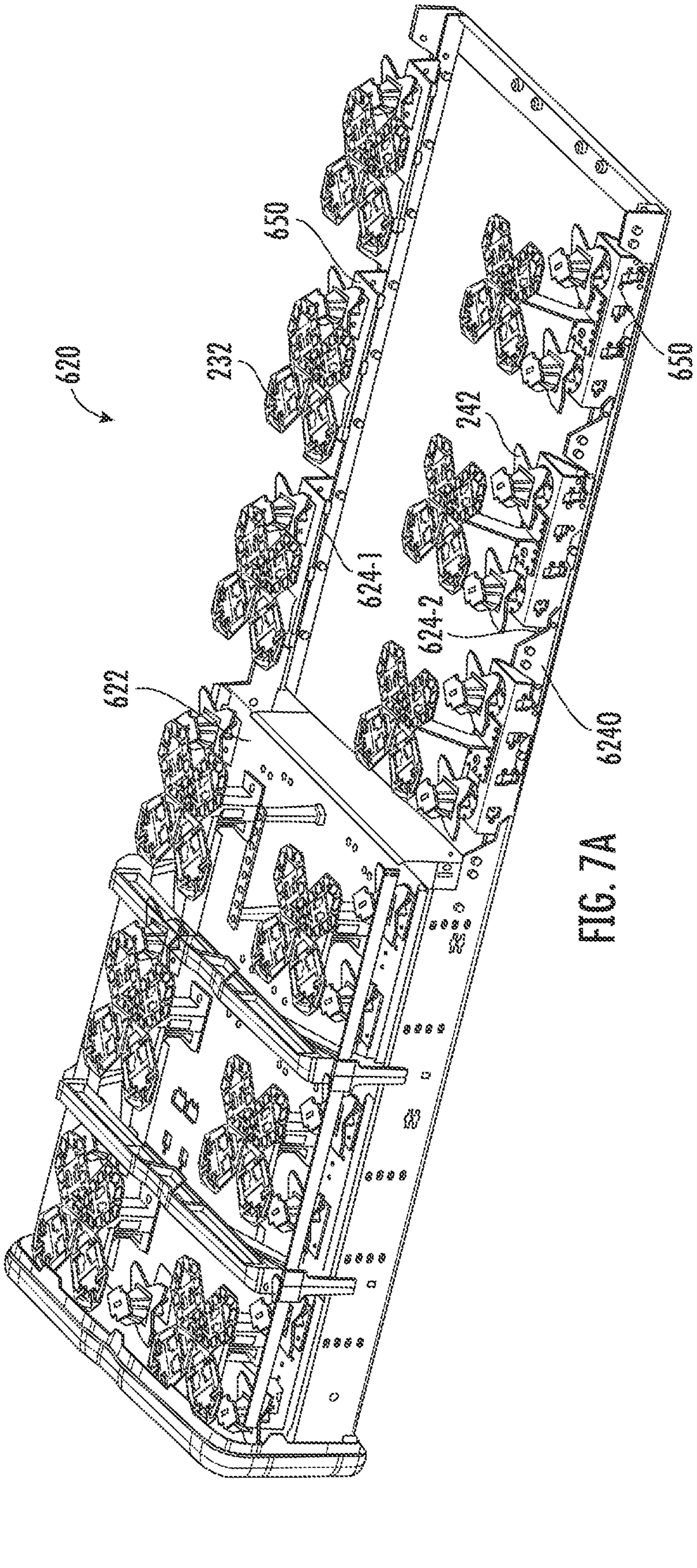
FIG. 7A is a perspective view of a passive reflector assembly according to still further embodiments of the present invention.
Figure 7B:
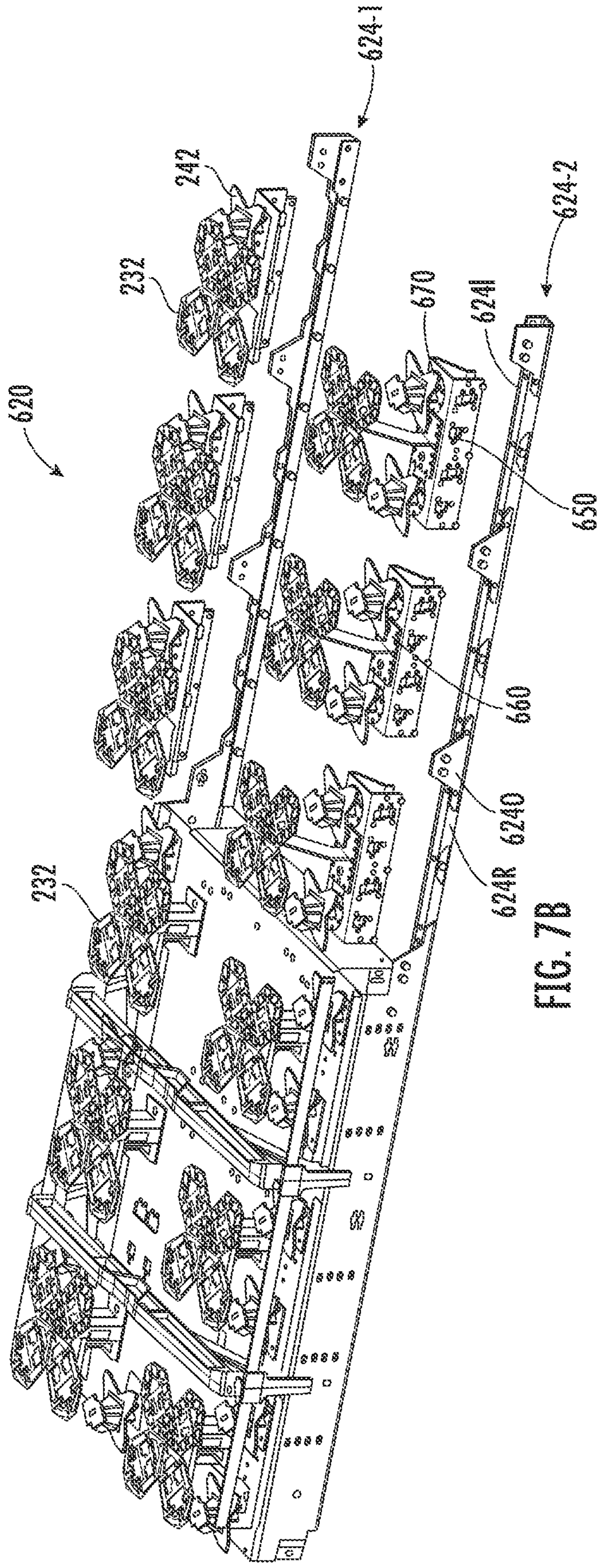
FIG. 7B is an exploded perspective view of the passive reflector assembly of FIG. 7A.
Figure 7C:
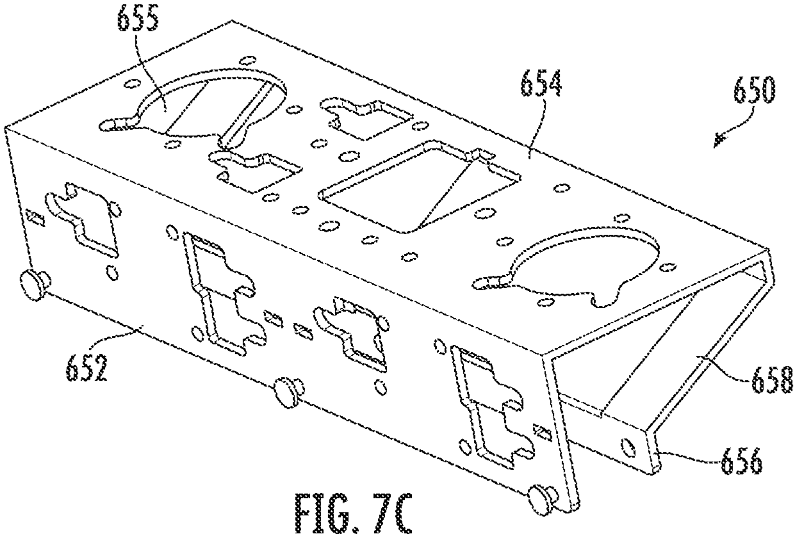
FIG. 7C is a perspective view of one of the dielectric auxiliary strips included in the passive reflector assembly of FIG. 7A.
Figure 7D:
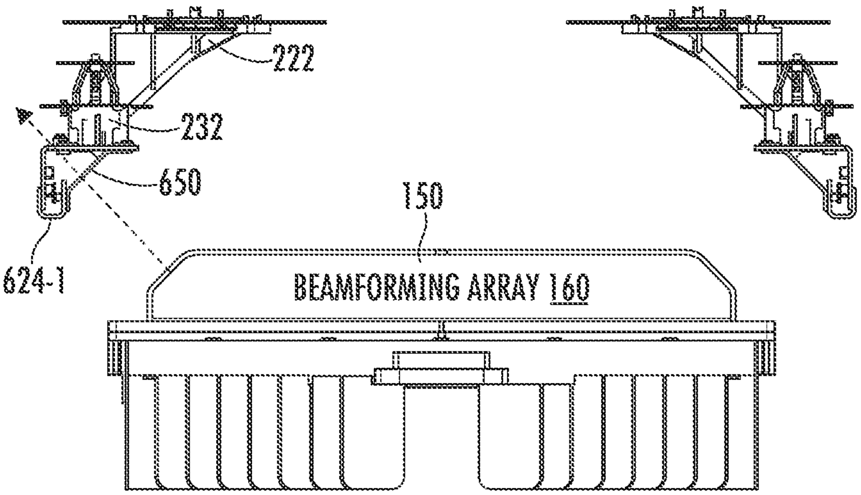
FIG. 7D is a schematic top view of a base station antenna that includes the passive reflector assembly of FIG. 7A that illustrates how the dielectric auxiliary strips included therein enhance the azimuth scanning performance of a beamforming array of radiating elements included in an active antenna module that may be mounted rearwardly of the passive reflector assembly.
Figure 7E:
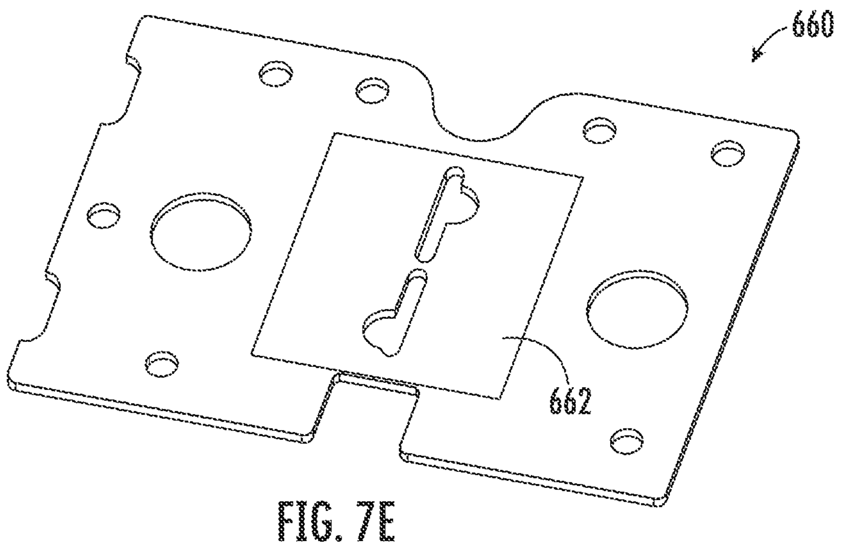
FIGS. 7E and 7F are perspective views of the feed board printed circuit boards for the low-band radiating elements and the mid-band radiating elements 232 that are mounted on the longitudinally-extending reflector strips of the passive reflector assembly of FIGS. 7A-7B.
Figure 7F:
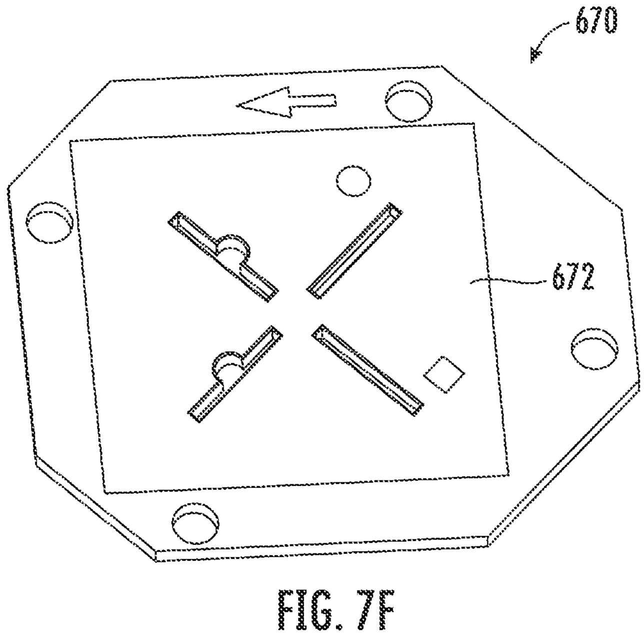

FIGS. 7A-7F illustrate a passive reflector assembly 620 according to further embodiments of the present invention (and components thereof) that makes use of the above-described dielectric auxiliary strips. In particular, FIG. 7A is a perspective view of the passive reflector assembly 620, while FIG. 7B is an exploded perspective view of the passive reflector assembly 620. FIG. 7C is a perspective view of a dielectric auxiliary strip 650 that is included in the passive reflector assembly 620 of FIGS. 7A-7B. FIG. 7D is a schematic top view of the passive reflector assembly 620 positioned in front of an active antenna module 150 that illustrates how the dielectric auxiliary strips 650 included therein enhance the azimuth scanning performance of the beamforming array 160 of radiating elements included in the active antenna module 150. Finally, FIGS. 7E and 7F are perspective views of the feed board printed circuit boards for the low-band radiating elements 232 and the mid-band radiating elements 242 that are mounted on the longitudinally-extending reflector strips 650 of the passive reflector assembly 620.

Referring to FIGS. 7A-7B, the passive reflector assembly 620 includes a main reflector 622. The main reflector 622 may be identical to the main reflector 222 that is discussed above except that the reflector strips 624-1, 624-2 that extend from (and are integral with) the main reflector 622 have a different design than the reflector strips 224-1, 224-2. In particular, each reflector strip 624 includes a rear wall 624R, an outer sidewall 624O and an inner sidewall 624I. The outer and inner sidewalls 624O, 624I each extend forwardly from the rear wall 624R, and may include one or more recesses so that they are only partial walls (as shown). The inner sidewall 624I may be formed as a small lip that only extends forwardly a short distance in order to reduce how much the inner sidewall 624I blocks RF radiation emitted by the beamforming array 160 that is mounted rearwardly of the passive reflector assembly 620. Thus, the inner sidewalls 624I may not extend as far forwardly as the outer sidewalls 624O. Moreover, large recesses may be included in each outer sidewall 624O. The net result is that the reflector strips 624 may have less metal than the reflector strips 224, and may thus tend to reflect less RF radiation emitted by the beamforming array 160.

As can further be seen in FIGS. 7A-7B, three dielectric auxiliary strips 650 are mounted to extend forwardly from each longitudinally-extending reflector strip 624. A low-band radiating element 232 and two mid-band radiating elements 242 are mounted on each dielectric support structure 650. Each low-band radiating element 232 may be mounted on a respective low-band feed board 660, and each mid-band radiating element 242 may be mounted on a respective mid-band feed board 670. The dielectric auxiliary strips 650 may be formed of a dielectric material such as a plastic material. The dielectric auxiliary strips 650 may enhance the strength and/or the rigidity of the reflector strips 624.

FIG. 7C is a perspective view of one of the dielectric auxiliary strips 650. In the example embodiment shown, the dielectric auxiliary strip 650 includes an outer wall 652, a front wall 654, an inner wall 656 and supports 658 that extend between the inner wall 658 and the front wall 654. The front wall 654 forms a forwardly-facing radiating element mounting surface. Feed boards 660, 670 for each radiating element 232, 242 may be mounted on the front wall 654. The front wall 654 includes openings 655 that allow cables (not shown) to extend therethrough to connect to the feedboards 660, 670 (or directly to the radiating elements 232, 242). The outer wall 652 and/or the inner wall 656 may be connected to the reflector strip 624 via, for example fasteners such as rivets.

FIG. 7D is a schematic top view of the passive reflector assembly 620 positioned in front of an active antenna module 150 that illustrates how the combination of the smaller reflector strips 624 in combination with the dielectric auxiliary strips 650 may enhance the azimuth scanning performance of the beamforming array 160 that is included in the active antenna module 150. As shown by the dashed arrow, when the beamforming array 160 is electronically scanned to a large scanning angle in the azimuth plane, the RF radiation emitted by the outermost columns of radiating elements of array 160 may be directed toward one of the reflector strips 624. Since the reflector strips 624 include a smaller amount of metal and do not (for the most part) extend very far forwardly, most of this RF radiation will not impinge on the reflector strip 624 but instead is directed toward the dielectric auxiliary strips 650. Since these auxiliary strips 650 are formed of a dielectric material, the RF radiation will pass through the dielectric auxiliary strips 650 and will not be reflected. Accordingly, the passive reflector assembly 620 may have less of a negative impact on the performance of the beamforming array 160 that is included in the active antenna module 150.

As described above, the radiating elements 232, 242 that are mounted on the reflector strips of the passive reflector assemblies according to embodiments of the present invention are typically mounted on feed board printed circuit boards. As is well known in the art, feed board printed circuit boards typically include a metal ground plane on one side thereof and metal traces on the other side thereof that carry RF signals between the feed board printed circuit board and the radiating element(s) mounted thereon. The ground plane on the feed board printed circuit boards, however, will reflect RF radiation incident thereon such as RF radiation emitted by the beamforming array 160. Accordingly, pursuant to a further aspect of the present invention, feed board printed circuit boards are provided that have smaller metal ground planes.

FIG. 7E is a perspective rear view of a feed board printed circuit board 660 for one of the low-band radiating elements 232. As shown in FIG. 7E, a metal ground plane 662 is formed on the rear side of the feed board printed circuit board 660. This ground plane 662, however, only encompasses about 25% of the feed board printed circuit board 660, and hence will reflect significantly less high-band radiation than would a conventional feed board printed circuit board.

FIG. 7F is a perspective rear view of a feed board printed circuit board 670 for one of the mid-band radiating elements 242. As can be seen in FIG. 7F, a metal ground plane 672 is formed on the rear side of the feed board printed circuit board 670. As can be seen from FIGS. 7A-7B and 7F, this ground plane 672, however, has a footprint that is significantly smaller than the footprint of the printed circuit board that implements the dipole radiators of the mid-band radiating element 242. The small size of the ground plane 672 acts to reduce the amount of high-band radiation that is reflected by the feed board printed circuit board 670.

As shown in FIGS. 7A-7F, in some embodiments, base station antennas are provided that include a longitudinally-extending passive reflector assembly 620 that includes a main reflector 622 that has a main reflecting surface and spaced-apart first and second integrated strips 624-1, 624-2 that are integral with and extend longitudinally from respective first and second opposed sides of the main reflector 622. A first plurality of non-metal (dielectric) auxiliary strips 650 are mounted on the first integrated strip 624-1, and a second plurality of auxiliary strips 650 are mounted on the second integrated strip 624-2. Each dielectric auxiliary strip 650 includes a respective forwardly-facing radiating element mounting surface.

Each of the dielectric auxiliary strips 650 includes an outer wall 652 that connects to a first side of the forwardly-facing radiating element mounting surface 654 and an inner wall 656. One or more supports 658 connect the inner wall 656 to a second side of the forwardly-facing radiating element mounting surface 654. The outer wall 652 and the inner wall 656 may each be connected to the integrated strip 624 by fasteners such as rivets (not shown). The forwardly-facing radiating element mounting surface 654 may include a plurality of cable openings 655 in some embodiments. In some embodiments, first through third feedboards 660, 670 are mounted on the auxiliary strip 624, and first through third radiating elements 232, 242 are mounted on the respective first through third feedboards 660, 670. The first radiating element may be a low-band radiating element 232 that is configured to operate in a first frequency band and the second and third radiating elements may be mid-band radiating elements 242 that are configured to operate in a second frequency band that encompasses higher frequencies than the first frequency band. Metal ground planes 672 of the second and third feedboards each have a smaller footprint than a dipole radiator printed circuit board of the respective second and third radiating elements 242.

While the present invention has been described above primarily with reference to the accompanying drawings, it will be appreciated that the invention is not limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

It will also be appreciated that the various embodiments described above may be combined in any and all ways to provide additional embodiments.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A base station antenna that extends along a longitudinal axis, the base station antenna comprising:

a reflector assembly; and a first radiating element having a first feed stalk, a first radiator and a second radiator, where a base of the first feed stalk is adjacent the reflector assembly and the first radiator and the second radiator are adjacent a distal end of the first feed stalk, wherein a center of the first radiator is offset from the base of the first feed stalk in a longitudinal direction that is parallel to the longitudinal axis, and a center of the second radiator is offset from the base of the first feed stalk in the longitudinal direction, and wherein the first and second radiators have different polarizations and centers of the first and second radiators are offset from the base of the first feed stalk in a same direction.

2. The base station antenna of claim 1, wherein the reflector assembly includes a main reflector, longitudinally-extending first and second reflector strips that extend from the main reflector and are spaced apart from each other in a transverse direction that is perpendicular to the longitudinal direction, and a transversely-extending third reflector strip that extends between the first and second reflector strips.

3. The base station antenna of claim 2, wherein the first radiating element is mounted to extend forwardly from the third reflector strip.

4. The base station antenna of claim 3, wherein the reflector assembly includes an opening that is bounded by an upper edge of the main reflector and the first through third reflector strips.

5. The base station antenna of claim 4, wherein at least half of the first radiator overlaps the opening in a direction perpendicular to the main reflector.

6. The base station antenna of claim 2, wherein front surfaces of the respective first and second reflector strips extend in a first plane that is positioned rearwardly of a plane defined by a front surface of the main reflector.

7. A base station antenna that extends along a longitudinal axis, the base station antenna comprising:

a reflector assembly; and a first radiating element having a first feed stalk and a first radiator, where a base of the first feed stalk is adjacent the reflector assembly and the first radiator is a distal end of the first feed stalk;

a first radio frequency ("RF") port, wherein the first radiating element is part of a first array of radiating elements that are all coupled to the first RF port, and wherein a second radiating element that is part of the first array of radiating elements is mounted to extend forwardly from the first reflector strip, wherein the reflector assembly includes a main reflector, longitudinally-extending first and second reflector strips that extend from the main reflector and are spaced apart from each other in a transverse direction that is perpendicular to the longitudinal direction, and a transversely-extending third reflector strip that extends between the first and second reflector strips, wherein the first radiating element is mounted to extend forwardly from the third reflector strip, and wherein a center of the first radiator is offset from the base of the first feed stalk in a longitudinal direction that is parallel to the longitudinal axis.

8. The base station antenna of claim 7, wherein a third radiating element that is part of the first array of radiating elements is mounted to extend forwardly from the main reflector.

9. The base station antenna of claim 7, wherein the second radiating element has a second feed stalk and a second radiator, where a base of the second feed stalk is adjacent the reflector assembly and the second radiator is adjacent a distal end of the second feed stalk, and wherein a center of the second radiator is offset from the base of the second feed stalk in the transverse direction.

10. The base station antenna of claim 9, wherein the first feed stalk is a tilted feed stalk that extends forwardly from the third reflector strip in a first plane and the second feed stalk is a tilted feed stalk that extends forwardly from the first reflector strip in a second plane, where the first plane is substantially perpendicular to the second plane.

11. The base station antenna of claim 7, wherein the second radiating element extends forwardly from a portion of the first reflector strip that is widened in the transverse direction.

12. The base station antenna of claim 7, wherein the first reflector strip comprises a first integrated strip that is monolithic with the main reflector and a first auxiliary strip that is mounted on the first integrated strip, and the second reflector strip comprises a second integrated strip that is monolithic with the main reflector and a second auxiliary strip that is mounted on the second integrated strip.

13. The base station antenna of claim 12, wherein the first auxiliary strip includes a front wall that is parallel to a front surface of the main reflector and a sidewall that extends rearwardly from the front wall, and the first integrated strip includes a rear wall that is parallel to the front surface of the main reflector and a sidewall that extends forwardly from the rear wall.

14. The base station antenna of claim 12, wherein the second radiating element is mounted to extend forwardly from a feed board, and the feed board is mounted on the first auxiliary strip.

15. A base station antenna, comprising:

a reflector assembly having a main reflector that includes a forwardly-facing planar main reflector surface and spaced-apart first and second reflector strips that extend from respective first and second opposed sides of the main reflector; and wherein the first reflector strip includes a front wall that has a widened region that is wider in a transverse direction than are first and second narrowed regions of the front wall that are on either side of the widened region in a longitudinal direction of the first reflector strip, wherein the longitudinal direction is perpendicular to the transverse direction, further comprising a feedboard mounted on the widened region.

16. The base station antenna of claim 15, wherein the first reflector strip further includes an outer sidewall and an inner sidewall, wherein the inner sidewall comprises a plurality of discontinuous segments.

17. The base station antenna of claim 15, wherein the first reflector strip is a tubular reflector strip that has the front wall, a rear wall and first and second sidewalls.

18. The base station antenna of claim 15, wherein the reflector assembly further comprising a first radio frequency ("RF") choke that is positioned behind the main reflector, wherein a width of the first RF choke in the transverse direction is greater than widths of the first and second narrowed regions of the front wall.

19. The base station antenna of claim 15, wherein the first reflector strip comprises a first integrated strip that is monolithic with the main reflector and a first auxiliary strip that is mounted on the first integrated strip.

* * * * *